United States Patent
De Boer et al.

(10) Patent No.: US 11,079,530 B2
(45) Date of Patent: Aug. 3, 2021

(54) LIGHTING SYSTEM WITH LIGHT GUIDING BODY HAVING TRIVALENT CERIUM LUMINESCENT MATERIAL

(71) Applicant: SIGNIFY HOLDING B.V., Eindhoven (NL)

(72) Inventors: Dirk Kornelis Gerhardus De Boer, Den Bosch (NL); Dominique Maria Bruls, Heeze (NL); Gerardus Everardus Marie Hannen, Weert (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/982,555

(22) PCT Filed: Mar. 18, 2019

(86) PCT No.: PCT/EP2019/056702
§ 371 (c)(1),
(2) Date: Sep. 19, 2020

(87) PCT Pub. No.: WO2019/185390
PCT Pub. Date: Oct. 3, 2019

(65) Prior Publication Data
US 2021/0003762 A1 Jan. 7, 2021

(30) Foreign Application Priority Data
Mar. 29, 2018 (EP) ..................... 18165188

(51) Int. Cl.
*G02B 6/00* (2006.01)
*F21V 8/00* (2006.01)
(Continued)

(52) U.S. Cl.
CPC ............. *G02B 6/0003* (2013.01); *F21V 9/32* (2018.02); *F21V 29/502* (2015.01);
(Continued)

(58) Field of Classification Search
CPC .......... F21V 5/10; F21V 9/20; F21V 2200/13; F21K 9/61; F21K 9/64; G02B 6/003; G02B 6/008
See application file for complete search history.

(56) References Cited

U.S. PATENT DOCUMENTS 5,813,753 A * 9/1998 Vriens ................... H01L 33/502
257/13
6,350,041 B1 * 2/2002 Tarsa ...................... F21V 29/74
362/231

(Continued)

FOREIGN PATENT DOCUMENTS

| JP | 2014192127 A | 10/2014 |
|---|---|---|
| WO | 2006054203 A1 | 5/2006 |
| WO | 2016179586 A1 | 11/2016 |

OTHER PUBLICATIONS

Waetzig et al "Influence of sample thickness and concentration of CE dopant on the optical properties of YAG: Ce ceramic phosphors for white LEDs", Journal of Materials Research, 2014, vol. 20, No. 19, pp. 2318-2324.

*Primary Examiner* — Ismael Negron
(74) *Attorney, Agent, or Firm* — Daniel J. Piotrowski

(57) ABSTRACT

A lighting system includes a plurality of light sources; an elongated luminescent body defining a length (L) and a height or diameter (H), and having a light input face, a light output face, and at least one side face bridging the height or diameter (H); a garnet type $A_3B_5O_{12}$ luminescent material including trivalent cerium, provided in the elongated luminescent body with a height dependent concentration range defined by a minimum concentration $y_{min}=0.036*x^{-1}$ and a maximum concentration $y_{max}=0.17*x^{-1}$, where y is the trivalent cerium concentration in % relative to the A element, and x is the height (H) in mm; at least one heat transfer elements in thermal contact with the elongated luminescent (Continued)

body; and a reflector provided opposite the light sources on the elongated luminescent body. The garnet type $A_3B_5O_{12}$ luminescent material converts at least part of light from the light sources into converted light.

15 Claims, 5 Drawing Sheets

(51) Int. Cl.

| | | |
|---|---|---|
| F21V 29/502 | (2015.01) | |
| F21V 9/32 | (2018.01) | |
| F21Y 103/10 | (2016.01) | |
| F21Y 115/10 | (2016.01) | |
| F21W 131/406 | (2006.01) | |

(52) U.S. Cl.
CPC ......... *G02B 6/0055* (2013.01); *G02B 6/0066* (2013.01); *G02B 6/0085* (2013.01); *F21W 2131/406* (2013.01); *F21Y 2103/10* (2016.08); *F21Y 2115/10* (2016.08)

(56) References Cited

U.S. PATENT DOCUMENTS

| | | | |
|---|---|---|---|
| 7,316,497 B2* | 1/2008 | Rutherford | H04N 9/315 |
| | | | 348/E9.027 |
| 9,810,826 B2* | 11/2017 | Chestakov | G03B 21/16 |
| 10,473,275 B2* | 11/2019 | Peeters | G02B 6/0068 |
| 10,544,911 B2* | 1/2020 | Van Bommel | G02B 6/0031 |
| 10,698,150 B2* | 6/2020 | Vrehen | G02B 6/0085 |
| 10,823,893 B2* | 11/2020 | Hoelen | G03B 21/208 |
| 2016/0315232 A1 | 10/2016 | Van Bommel et al. | |
| 2017/0315433 A1 | 11/2017 | Ronda et al. | |
| 2020/0041885 A1* | 2/2020 | Peeters | F21S 41/151 |
| 2020/0088927 A1* | 3/2020 | Denissen | G02B 6/0068 |
| 2020/0158936 A1* | 5/2020 | Hikmet | F21V 29/70 |
| 2020/0326043 A1* | 10/2020 | De Boer | F21K 9/64 |
| 2020/0326044 A1* | 10/2020 | Haenen | G02B 6/0096 |

* cited by examiner

LIGHTING SYSTEM WITH LIGHT GUIDING BODY HAVING TRIVALENT CERIUM LUMINESCENT MATERIAL

CROSS-REFERENCE TO PRIOR APPLICATIONS

This application is the U.S. National Phase application under 35 U.S.C. § 371 of International Application No. PCT/EP2019/056702, filed on Mar. 18, 2019, which claims the benefit of European Patent Application No. 18165188.6, filed on Mar. 29, 2018. These applications are hereby incorporated by reference herein.

FIELD OF THE INVENTION

The invention relates to a lighting system, such as for use in a projector or for use in stage lighting. The invention also relates to a luminaire or projection system comprising such lighting system.

BACKGROUND OF THE INVENTION

Luminescent rods are known in the art. WO2006/054203, for instance, describes a light emitting device comprising at least one LED which emits light in the wavelength range of >220 nm to <550 nm and at least one conversion structure placed towards the at least one LED without optical contact, which converts at least partly the light from the at least one LED to light in the wavelength range of >300 nm to ≤1000 nm, characterized in that the at least one conversion structure has a refractive index n of >1.5 and <3 and the ratio A:E is >2:1 and <50000:1, where A and E are defined as follows: the at least one conversion structure comprises at least one entrance surface, where light emitted by the at least one LED can enter the conversion structure and at least one exit surface, where light can exit the at least one conversion structure, each of the at least one entrance surfaces having an entrance surface area, the entrance surface area(s) being numbered $A_1 \ldots A_n$ and each of the at least one exit surface(s) having an exit surface area, the exit surface area(s) being numbered $E_1 \ldots E_n$ and the sum of each of the at least one entrance surface(s) area(s) A being $A=A_1+A_2 \ldots +A_n$ and the sum of each of the at least one exit surface(s) area(s) E being $E=E_1+E \ldots +E_n$.

JP2014192127 describes a fluorescent light source device that includes an excitation light source for exciting a fluorescent material and a wavelength conversion member which has the fluorescent material for converting the wavelength of excitation light from the excitation light source and that can suppress thermal damage to the wavelength conversion member due to irradiation with the excitation light, converge and emit fluorescent light on an emission surface of a small area, and attain high reliability and high efficiency. A wavelength conversion member is supported by a base, and has an excitation light incidence surface on which excitation light is made incident, a fluorescent light emission surface from which fluorescent light generated by converting the excitation light is emitted, and a heat radiation surface which abuts on the base, individually, and the excitation light incidence surface has larger area than the fluorescent light emission surface.

Waetzig et al., in "*Influence of sample thickness and concentration of Ce dopant on the optical properties of YAG:Ce ceramic phosphors for white LEDs*", Journal of Materials Research, 2014, vol. 20, no. 19, p. 2318-2324, describes that $Y_3Al_5O_{12}$:Ce and $(Gd,Y)_3Al_5O_{12}$:Ce ceramic phosphors were fabricated by solid-state reaction method under vacuum sintering. Pure garnet phase of these (Gd,Y)AG:Ce ceramics was confirmed by X-ray diffraction (XRD) with Gd content of 0, 25%, 50% and 75%, respectively. The electroluminescent properties of the unpacked and packed LED devices based on YAG:Ce and (Gd,Y)AG:Ce ceramics were measured. The highest luminous efficacy of 130.5 lm/W was achieved by YAG:Ce ceramic phosphor with thickness of 0.4 mm. However, the correlated color temperature (CCT) of the LED device based on it was high due to a lack of red component in the emission light. Therefore, $Y_3Al_5O_{12}$:Ce/$(Gd_x,Y_{1-x})_3Al_5O_{12}$:Ce dual-layered composite structure ceramics phosphor were designed and fabricated according to the color space chromaticity diagram. In one demonstration, various CCT could be tuned from 3100 K to 3600 K by these dual-layered structure, while the luminous efficacy can reach 109.9 lm/W. The high luminous efficacy and safe warm white light emitted by these dual-layered phosphors made them promising candidate for white LED devices. Polycrystalline translucent ceramics are provided.

SUMMARY OF THE INVENTION

High brightness light sources are interesting for various applications including spots, stage-lighting, headlamps and digital light projection, and (fluorescence) microscopy and endoscopy etc. For this purpose, it is possible to make use of so-called light concentrators where shorter wavelength light is converted to longer wavelengths in a highly transparent luminescent material. A rod of such a transparent luminescent material can be illuminated by LEDs to produce longer wavelengths within the rod. Converted light which will stay in the luminescent material, such as a (trivalent cerium) doped garnet, in the waveguide mode and can then be extracted from one of the (smaller) surfaces leading to an intensity gain.

In embodiments, the light concentrator may comprise a rectangular bar (rod) of a (transparent) phosphor doped, high refractive index garnet, capable to convert blue light into green light and to collect this green light in a small étendue output beam. The rectangular bar may have six surfaces, four large surfaces over the length of the bar forming the four side walls, and two smaller surfaces at the end of the bar, with one of these smaller surfaces forming the "nose" where the desired light is extracted.

Under e.g. blue light radiation, the blue light excites the phosphor, after the phosphor start to emit green light in all directions, assuming some cerium comprising garnet applications. Since the phosphor is embedded in—in general—a high refractive index bar, a main part of the converted (green) light is trapped into the high refractive index bar and wave guided to the nose of the bar where the (green) light may leave the bar. The amount of (green) light generated is proportional to the amount of blue light pumped into the bar. The longer the bar, the more blue LED's can be applied to pump phosphor material in the bar and the number of blue LED's to increase the brightness of the (green) light leaving at the nose of the bar can be used. The phosphor converted light, however, can be split into two parts.

A first part consists of first types of light rays that will hit the side walls of the bar under angles larger than the critical angle of reflection. These first light rays are trapped in the high refractive index bar and will traverse to the nose of the bar where it may leave as desired light of the system.

Relative to some prior art systems, an increase in intensity of the output, an improvement of the efficiency, better thermal management, or more reliability of prior art systems is desirable.

Hence, it is an aspect of the invention to provide an alternative lighting system comprising a luminescent concentrator, which preferably further at least partly obviates one or more of above-described drawbacks and/or which may have a relatively higher efficiency. The present invention may have as object to overcome or ameliorate at least one of the disadvantages of the prior art, or to provide a useful alternative.

Especially, the invention provides a lighting system ("system") comprising:
- a light source configured to provide light source light;
- an elongated luminescent body ("body", "luminescent body", "elongated body", "concentrator", "light transmissive body") having a length (L), and a height (H) or diameter (D), the elongated luminescent body having light guiding properties, and the elongated luminescent body comprising:
- one or more side faces over at least part of the length (L), comprising a radiation input face, wherein the elongated luminescent body further comprises a radiation exit window bridging at least part of the height (H) or diameter (D);
- a garnet type $A_3B_5O_{12}$ luminescent material comprising trivalent cerium, with a height dependent concentration, selected from a concentration range defined by a minimum concentration $y_{min}=0.036*x^{-1}$ and a maximum concentration $y_{max}=0.17*x^{-1}$, wherein y is the trivalent cerium concentration in mole % relative to the A element, and wherein x is the height (H) or diameter (D) in mm, wherein the garnet type $A_3B_5O_{12}$ luminescent material is configured to convert at least part of the light source light (11) into converter light;
- one or more heat transfer elements in thermal contact with one or more side faces; and
- a reflector configured to reflect light source light escaping from the elongated luminescent body back into the elongated luminescent body, wherein the elongated luminescent body is configured between the light source and the reflector.

The invention (also) provides in embodiments a lighting system ("system") comprising a light source, especially a plurality of light sources, an elongated luminescent body ("body", "luminescent body", "elongated body", "concentrator", "light transmissive bod"), one or more heat transfer elements, and a reflector. Especially, the lighting system comprises a light source configured to provide light source light. Further, the lighting system especially comprises an elongated luminescent body having a length (L), the elongated luminescent body comprises one or more, such as in embodiments a plurality, of side faces over at least part of the length (L), wherein the side faces comprise a first side face, comprising a radiation input face ("radiation entrance window"), and a second side face configured parallel to the first side face, wherein the side faces define a height (H), wherein the elongated luminescent body further comprises a radiation exit window bridging at least part of the height (H) between the first side face and the second side face. Especially, the light transmissive body comprises (n) side faces, wherein n≥3.

Yet further, the elongated luminescent body comprises a garnet type $A_3B_5O_{12}$ luminescent material comprising trivalent cerium, with in specific embodiments a height dependent concentration selected from a concentration range defined by a minimum concentration $y_{min}=0.036*x^{-1}$ and a maximum concentration $y_{max}=0.17*x^{-1}$, wherein y is the trivalent cerium concentration in mole % relative to the A element, and wherein x is in embodiments the height in mm, wherein the garnet type $A_3B_5O_{12}$ luminescent material is configured to convert at least part of the light source light into converter light.

The one or more heat transfer elements are in thermal contact with one or more side faces, and are especially configured to transfer heat away (from the luminescent body) during operation of the lighting system. Further, the reflector is especially configured at the second side face (and other faces that are not the radiation input face) and configured to reflect light source light escaping from the elongated luminescent body via second face back into the elongated luminescent body. This reflected light may be converted light as well as light source light that is used to illuminate the radiation input face, but that remains unabsorbed during propagation through the luminescent body.

With such system, relative to some prior art systems the efficiency can be improved, thermal management may be better, and the system may (therefore) operate more reliably.

An important issue of high lumen density (HLD) devices is the cooling of the luminescent rod. In a configuration with two-sided illumination, and a rod with a rectangular cross-section, only two sides are available for this. In that case, the maximum performance is (to some extend) limited by thermal quenching effects that occur in the luminescent rod. In a configuration with single-sided illumination, three sides are available, enabling better cooling. Furthermore, by implementing single-sided illumination combined with the 3-sided cooling of the rod, a single cooling path can be implemented via the LED board. This means that there is thermal coupling between the rod-cooling means and the LED board/PCB cooling in such a way that all heat is being transferred (e.g. to an external heatsink) through the LED board. This means that no additional cooling path from the rod holder towards the "outside world" is needed. This enables a more compact building form factor of the HLD module, enabling easy implementation in volume-critical systems, which may operate at relatively low optical output powers.

On the other hand, in the case of high-power applications, single-sided pumped designs increase the possibility for dedicated luminescent rod cooling separate from the LED-cooling interface, thus e.g. enabling slim form-factor systems.

Another issue relates to the cerium concentration of the rod material. The concentration should be high enough to absorb the incident blue light. However, if it is too high, several detrimental effects may happen, like concentration quenching and reabsorption, all leading to a diminished output of green light and more heat generation. Furthermore, in the production processes of the converter material, a lower cerium concentration may be highly beneficial, as this generally means a more controllable production process and higher production yields.

Furthermore, especially when a single-crystal luminescent converter is applied in a two-sided pumped system, there are issues concerning the cerium concentration. Ideally, all the blue light from the LED pump is converted into green light during the propagation of the blue light through the converter rod that generally only has a thickness of only 1.2 mm or less. In this case, it is quite a challenge to incorporate enough cerium into the material during crystal growth that is needed to reach "full conversion". In this case, the limits of what is possible during crystal growth seem to be reached, imposing technical challenges and a limited yield of useable crystals. Single-sided illumination, however, allows for lower cerium concentrations. In such a system, larger tolerances for the cerium concentration apply, as it is easier in such a system to obtain "full or nearly full conversion" of the blue LED pump.

In the case of two-sided pumping, a minimum cerium concentration is required to reach full conversion, which is very difficult to achieve and is close to the theoretical maximum limit that can be achieved during single-crystal growth. In practice, often a too low cerium concentration is achieved. However, from an engineering perspective, these cerium levels already introduce many issues during crystal growth. Also with respect to system operation these cerium concentrations may already cause some thermal and optical issues as will be discussed later. In the case of single-sided pumping, the required minimum cerium concentration is much lower and can be easily met by standard single-crystal growth methods. Furthermore, if during growth the final cerium concentration would be too high (>minimum required cerium concentration), this is not likely to cause detrimental effects with respect to system performance.

One advantage of a low cerium concentration is that there is less chance of concentration quenching. At high concentration, cerium sites may be so close to each other that energy is transferred to other sites and has a larger chance to be converted to heat instead of green radiation. Also, temperature quenching (the decrease of green luminescence at higher temperature) in general is lower at low cerium concentration. Another advantage is that, at lower concentration, there is less chance of reabsorption. Part of the converted (green) light can be absorbed in the rod; part of this is emitted again but part is lost (because of a finite quantum efficiency and escape losses). So, at lower concentration, more green light can reach the rod 'nose'. A possible further advantage might be that, at lower cerium concentration, the local intensity of green light will be smaller. The advantage of this might be that there is less chance of (local) photo saturation caused by excited-state absorption (i.e. loss of green light by absorption in the cerium level reached by blue absorption). Also, if a lower cerium concentration can be implemented and blue light passes the rod twice, the heat generated in the rod during light conversion (Stokes-shift) is more evenly distributed over the total volume. This prevents the formation of localized "hot-spots" in the crystal, preventing local thermal quenching and thermal runaways, which otherwise might result in catastrophic quenching.

By passing the rod (or bar) twice, essentially all light source light may be absorbed by the luminescent material. The term "essentially" and similar terms may here especially indicate at least 95%, or even at least 97%, such as at least 99%.

Moreover, it is not possible to make rod materials with a high cerium dopant concentration. Thin rods are especially interesting for applications demanding small étendue (e.g. microscopy). Furthermore, reducing the Ce concentration in single crystal rods will increase the yield during crystal growth.

Finally, due to the improved cooling of the rod material, it is possible to increase the incident blue flux onto this material. It is thus possible to drive the blue pumping LEDs at a higher output level, or use LEDs that already have a higher output flux. By doing so, a higher output flux from the HLD module can be achieved, while the temperature of the converter rod can still be kept below its critical quenching temperature. Hence, a system is obtained that is less thermally critical and thus can be operated at higher output fluxes.

Especially, the lighting system comprises a light source configured to provide light source light. The light source is especially a solid state light source, such as a LED. The light source especially provides light source light having a peak maximum at or close to the excitation maximum of the luminescent material. Therefore, in embodiments wherein the luminescent material has an excitation maximum $\lambda_{xm}$, wherein the light sources are configured to provide the source light with an intensity maximum $\lambda_{px}$, wherein $\kappa_{xm}-10$ nm$\leq\kappa_{px}\leq\lambda_{xm}+10$ nm, especially wherein $\lambda_{xm}-5$ nm$\leq\lambda_{px}\leq\lambda_{xm}+5$ nm, such as wherein $\lambda_{xm}-2.5$ nm$\leq\lambda_{px}\leq\lambda_{xm}+2.5$ nm. Especially, the light source wavelength is at wavelengths with at least an (excitation) intensity of 50% of the excitation maximum (intensity), such as at least 75% of the excitation maximum (intensity), such as at least 90% of the excitation maximum (intensity) (of the excitation maximum of the luminescent material).

The excitation maxima of $Lu_3Al_5O_{12}$, $Y_3Al_5O_{12}$, $(Y,Gd)_3Al_5O_{12}$, and $Y_3(Ga,Al)_5O_{12}$, are within the wavelength range of about 420-470 nm. Their respective absorption coefficients at their respective excitation maxima are all within a relative narrow range with the smallest only being a few percent smaller than the largest. Hence, though there are small differences (essentially smaller than 10% of the cerium comprising garnet with the largest absorption coefficient at its excitation maximum) the absorption coefficients at the respective excitation maxima are essentially the same.

Especially, the light source is configured with its optical axis perpendicular to the first side face, especially perpendicular the radiation input face (see further also below). Further, especially a plurality of light sources is applied. Hence, in specific embodiments the light sources have optical axes configured perpendicular to the first side face, especially perpendicular the radiation input face. Further, especially a single side face is illuminated with the light source light when n=4. When n is e.g. 6 or 8, in embodiments 1-3 side faces, such as 1-2 side faces or 1-4 side faces, such as 1-2 side faces, respectively, may be irradiated with the light source light. Hence, in embodiments the plurality of light sources is configured to provide the light source light to only one of the side faces.

Should the luminescent body have a circular or essentially oval cross-section, especially from a limited number of sides the rod will be illuminated.

In specific embodiments, wherein the luminescent body has a circular or essentially oval cross-section, the luminescent body is illuminated from a single side.

Hence, in embodiments the luminescent body may be illuminated from two or more directions, but such that relative to an axis of elongation the optical axis of the light sources are within an angle of 180° relative to the axis of elongation. Hence, the light source will be found within a circle section of at maximum 180° around the axis of elongation. Hence, the one or more heat transfer elements may especially be configured within a circle section of at least 180°.

Especially, in embodiments the light source light of the light source is provided in a direction parallel to the height or diameter of the elongated body. Hence, in embodiments the light source light may have an optical axis in a plane perpendicular to a plane comprising a body axis of the elongated body.

In embodiments, a plurality of light sources may be applied. In further specific embodiments, such plurality of light sources is configured in an array. Such array of light sources may be configured parallel to the body axis. Hence, in such specific embodiments the luminescent body may also be illuminated from a single side.

Therefore, in embodiments the lighting system may comprise a plurality of light sources, wherein the light sources have optical axes configured perpendicular to one of the one or more side faces (in the case of an elongated body comprising a plurality of side faces) or to a single side of the elongated body when the elongated body has a circular (or oval) cross-sectional shape.

When the elongated luminescent body is illuminated from a single side ("single-sided pumping"), and when a reflector is configured opposite of the light source(s), light source light that is not absorbed by the elongated luminescent body may be reflected back into the elongated luminescent body. Hence, with less cerium a high absorption may be achieved.

Therefore, in embodiments the reflector may be configured to reflect light source light escaping from the elongated luminescent body back into the elongated luminescent body, wherein the elongated luminescent body is configured between the light source and the reflector.

The reflector may thus in embodiments especially be configured to reflect light source light escaping from another side face or from another part of the side face from the elongated luminescent body back into the elongated luminescent body. As the optical axis of the light source may especially be configured perpendicular to the side face of the elongated (in case of a rod with circular cross-section) or perpendicular to one of the side faces (in case of e.g. a rod with a rectangular cross-section), light source light may escape from an opposite (part of the) side face.

In embodiments, the reflector is comprised by or provided by a heat transfer element. The reflector may also be configured to reflect luminescent material light.

Note that there may be more than one reflector, also at other positions than opposite of the light source.

Further embodiments of the light sources and their application are also elucidated below.

Further, the lighting system especially comprises a luminescent body, especially an elongated luminescent body, having a length (L), the (elongated) luminescent body comprising (n) side faces over at least part of the length (L), wherein n≥3. Hence, especially the (elongated) luminescent body has a cross-sectional shape (perpendicular to an axis of elongation) that is square (n=4), rectangular (n=4), hexagonal (n=6), or octagonal (n=8), especially rectangular. Would the luminescent body have a circular cross-section, n may be considered ∞. The (elongated) body includes a first end or first face, in general configured perpendicular to one or more of the (n) side faces and a second end or second face, which may be configured perpendicular to one or more of the side faces, and thus parallel to the first face, but which also may be configured under an angle unequal to 90° and unequal to 180°. The (elongated) luminescent body thus includes (n) side faces, which comprise a first side face, comprising a radiation input face, and a second side face configured parallel to the first side face, wherein the side faces define a height (H). The first and the second side face are configured parallel with luminescent body material in between, thereby defining the width of the luminescent body. The radiation input face is at least part of the first face which may be configured to receive the light source light. The (elongated) luminescent body further comprises a radiation exit window bridging at least part of the height (H) between the first side face and the second side face. Especially, the radiation exit window is comprised by the second face. The radiation exit window, which may in embodiments be essentially identical to the second face may be configured under an angle (or angles) with the one or more side faces selected from the range of larger 0° and smaller than 180°. In embodiments, the angle(s) may be selected from the range of 15-165°, such as 45-135°. Especially, the angle may be essentially 90°. Further embodiments are also elucidated below.

Yet further, the elongated luminescent body comprises a garnet type $A_3B_5O_{12}$ luminescent material comprising trivalent cerium ($Ce^{3+}$), with a height dependent concentration selected from a concentration range defined by a minimum concentration $y_{min}=0.036*x^{-1}$ and a maximum concentration $y_{max}=0.17*x^{-1}$, wherein y is the trivalent cerium concentration in % relative to the A element, and wherein h is the height in mm. Further, especially the height is selected from the range of 0.1-100 mm, such as 0.1-20 mm, like 0.1-10 mm, such as 0.5-2 mm.

In the formula, x may also be the diameter in mm. In embodiments wherein the elongated luminescent body has a cross-sectional shape other than circular or rectangular (including square), or anyhow more in general, x may refer to the length through the elongated luminescent body along the optical axis of a light source. Especially, the optical axis of the light source is configured perpendicular to one of the one or more side faces.

For instance, A may be yttrium. When e.g. the height is 1 mm, then h=1, as the height is in mm, leading to a possible concentration range which is 0.036-0.17%. Would however the height be 0.1 mm, then the concentration range from which the concentration can be selected is 0.36-1.7%. Would the concentration be indicated with y, then A can be replaced by $A_{1-x/100}Ce_{x/100}$. For instance, would x be 2.2 (see example), then this would result in $A_{0.978}Ce_{0.022}$.

In embodiments, A comprises one or more of yttrium, gadolinium and lutetium, and wherein B comprises one or more of aluminum and gallium. In embodiments, wherein A=Lu and wherein B=Al, or wherein A comprises Y and Lu, and wherein B=Al.

The element A, as well as (further) embodiments of the garnet, are further elucidated below.

The garnet type $A_3B_5O_{12}$ luminescent material is configured to convert at least part of the light source light into converter light. Especially, the garnet material is a material that has an absorption band in the range of 400-500 nm, such as with a maximum in the range of 420-480 nm. Upon excitation with the light source light, the luminescent material generates emission, with one or more wavelengths selected from especially the range of 500-800 nm, as known in the art. Further embodiments are also elucidated below.

The lighting system may comprise an optical element, wherein the optical element comprises the luminescent body, and optionally other optical elements. The lighting system may also include a plurality of luminescent bodies, wherein one or more, especially all, luminescent bodies are as defined herein. The optical element may include one or more luminescent bodies. Further, the lighting system may include a plurality of optical elements. Further embodiments are elucidated below.

The one or more heat transfer elements are in thermal contact with one or more side faces. The one or more heat transfer elements are especially configured to transfer heat away, from the luminescent body, during operation of the lighting system. Therefore, the heat transfer element(s) may also be indicated as "cooling element(s)". Hence, in embodiments the heat transfer element(s) may be heatsinks or may be functionally coupled to heatsinks Especially, the one or more heat transfer elements comprise a thermally conductive material, such as having a thermal conductivity of at least about 20 W/m/K, like at least about 30 W/m/K, such as at least about 100 W/m/K, like especially at least about 200 W/m/K.

Especially, the one or more heat transfer elements are configured parallel to at least part of one or more of the side faces over at least part of the length (L) of the (elongated) luminescent body. Further, especially the one or more heat transfer elements are configured at a shortest distance (d1) from the respective one or more side faces with 1 µm≤d1<100 µm. In this way, there may essentially no physical contact, which may lead to undesired outcoupling of the light source light and/or the luminescent material light, while there is a good thermal coupling. Especially, the shortest distance (d1) is selected from the range of 2 µm≤d1≤50 µm. Hence, when the shortest distance is at least 1 µm, there may essentially be no optical contact.

The one or more heat transfer elements may comprise one or more heat transfer element faces directed to one or more side faces. As indicated above, especially there is no physical contact. However, in embodiments there may be physical contact, but only part of a face of the luminescent body is in contact with part of the one or more heat transfer elements. Hence, in embodiments at least part of the one or more heat transfer element faces of the respective one or more heat transfer elements is in physical contact with the elongated luminescent body. Especially, in such embodiments the shortest distance (d1) is an average distance. Hence, in embodiments the one or more heat transfer elements are configured at an average shortest distance (d1) from the respective one or more side faces with 1 µm≤d1≤100 µm.

The one or more heat transfer elements may be configured as a monolithic heat transfer element. For instance, such monolithic heat transfer element may include a cavity, such as a slit, wherein the luminescent body may be configured. In this way, the monolithic heat transfer element may enclose n−1 side faces of the luminescent body. Hence, in embodiments the one or more heat transfer elements are at least in thermal contact with all side faces other than the first side face, and wherein the one or more heat transfer elements are configured as a monolithic heat transfer element. Optionally, part of the one or more heat transfer elements may also be in thermal contact with the first side face. Further, in specific embodiments the one or more heat transfer elements, such as especially the monolithic heat transfer element, may be configured in thermal contact with a support for the light source. In embodiments, this support may be thermally conductive, such as having a thermal conductivity as indicated above. The monolithic heat transfer element may also be indicated as integrated heat transfer unit. The term "monolithic heat transfer element" may also refer to a plurality of (different) monolithic heat transfer elements.

Further specific embodiments of the heat transfer element(s) are elucidated below.

As indicated above, the lighting system further includes a reflector. Especially, such reflector may be configured to reflect light source light escaping from the elongated luminescent body via second face back into the elongated luminescent body. In specific embodiments, the reflector is (thus) especially configured at the second side face. As in embodiments at least part of the one or more heat transfer elements is configured in thermal contact with at least part of the second side face, such reflector may be configured between the one or more heat transfer elements or may be comprised by the one or more heat transfer elements.

The one or more heat transfer elements may include one or more (external) faces, which may be indicated as heat transfer element faces. Therefore, in embodiments a heat transfer element face of the one or more heat transfer element may be directed to the second face comprises the reflector. The reflector may comprise a specular mirror, such as an aluminum (coated) mirror. The reflector may also comprise a diffuse reflector, such as a coating of a metal oxide or other reflective material that is (highly) reflective, especially in the visible (spectral range). Hence, the reflective material may be a specular reflective material, such as an aluminum mirror. The reflective material may also be diffuse reflective material, such as a coating of a particulate white material. Suitable reflective material for reflection in the visible may be selected from the group consisting of $TiO_2$, $BaSO_4$, $MgO$, $Al_2O_3$, and Teflon. Especially, all heat transfer element face that are directed to the luminescent body comprise such reflector. When a heat transfer element face comprises a reflector, the shortest distance between the reflector and the luminescent body may be as defined herein (for the shortest distance between the heat transfer element (face) and the luminescent body).

In embodiments, at least 30% of the total area of the one or more side faces may be in thermal contact with one or more heat transfer elements, like heat sinks. In specific embodiments, at least about 50% of the total area of the one or more side faces may be in thermal contact with one or more heat transfer elements.

In specific embodiments, the reflector and the heat transfer element may be the same element. The material of the heat transfer element can have good thermal conductance properties and a high optical reflectivity (>90%) in e.g. the visible spectral range. An example of such a material is AlSiMgMn.

As indicated above, the lighting system may comprise a plurality of light sources to provide light source light that is at least partly converted by the light transmissive body, more especially the luminescent material of the light transmissive body, into converter radiation. The converted light can at least partially escape form the first radiation exit window, which is especially in optical contact with the optical element, more especially the radiation entrance window thereof.

The optical element may especially comprise a collimator used to convert (to "collimate") the light beam into a beam having a desired angular distribution. Further, the optical element especially comprises a light transmissive body comprising the radiation entrance window. Hence, the optical element may be a body of light transmissive material that is configured to collimate the converter radiation from the luminescent body.

In specific embodiments, the optical element comprises a compound parabolic like collimator, such as a CPC (compound parabolic concentrator).

A massive collimator, such as a massive CPC, may especially be used as extractor of light and to collimate the (emission) radiation. Alternatively, one may also configured a dome with optical contact (n>1.00) on the nose of the rod or a hollow collimator, such as a CPC, to concentrate the (emission) radiation.

The optical element may have cross section (perpendicular to an optical axis) with a shape that is the same as the cross-section of the luminescent body (perpendicular to the longest body axis (which body axis is especially parallel to a radiation input face). For instance, would the latter have a rectangular cross section, the former may also have such rectangular cross section, though the dimension may be different. Further, the dimension of the optical element may vary over its length (as it may have a beam shaping function).

Further, the shape of the cross-section of the optical element may vary with position along the optical axis. In a specific configuration, the aspect ratio of a rectangular cross-section may change, preferably monotonically, with position along the optical axis. In another preferred configuration, the shape of the cross-section of the optical element may change from round to rectangular, or vice versa, with position along the optical axis.

As indicated above, first radiation exit window (of the elongated light transmissive body) is in optical contact with the radiation entrance window of the optical element. The term "optical contact" and similar terms, such as "optically coupled" especially mean that the light escaping the first radiation exit window surface area (A1) may enter the optical element radiation entrance window with minimal losses (such as Fresnel reflection losses or TIR (total internal reflection) losses) due to refractive index differences of these elements. The losses may be minimized by one or more of the following elements: a direct optical contact between the two optical elements, providing an optical glue between the two optical elements, preferably the optical glue having a refractive index higher that the lowest refractive index of the two individual optical elements, providing the two optical elements in close vicinity (e.g. at a distance much smaller than the wavelength of the light), such that the light will tunnel through the material present between the two optical elements, providing an optically transparent interface material between the two optical elements, preferably the optically transparent interface material having a refractive index higher that the lowest refractive index of the two individual optical elements, the optically transparent interface material might be a liquid or a gel or providing optical Anti Reflection coatings on the surfaces of (one or both of) the two individual optical elements. In embodiments, the optically transparent interface material may also be a solid material. Further, the optical interface material or glue especially may have a refractive index not higher than the highest refractive index of the two individual optical elements.

Instead of the term "in optical contact" also the terms "radationally coupled" or "radiatively coupled" may be used. The term "radiationally coupled" especially means that the luminescent body (i.e. the elongated light transmissive body) and the optical element are associated with each other so that at least part of the radiation emitted by the luminescent body is received by the luminescent material. The luminescent body and the optical element, especially the indicated "windows" may in embodiments be in physical contact with each other or may in other embodiments be separated from each other with a (thin) layer of optical glue, e.g. having a thickness of less than about 1 mm, preferably less than 100 µm. When no optically transparent interface material is applied, the distance between two elements being in optical contact may especially be about at maximum the wavelength of relevance, such as the wavelength of an emission maximum. For visible wavelengths, this may be less than 1 µm, such as less than 0.7 µm, and for blue even smaller.

Likewise, the light sources are radiationally coupled with the luminescent body, though in general the light sources are not in physical contact with the luminescent body (see also below). As the luminescent body is a body and as in general also the optical element is a body, the term "window" herein may especially refer to side or a part of a side.

Hence, the luminescent body comprises one or more side faces, wherein the optical element is configured to receive at the radiation entrance window at least part of the converter radiation that escapes from the one or more side faces.

This radiation may reach the entrance window via a gas, such as air directly. Also the radiation may be delivered via another interface material such as a liquid or transparent solid interface material. Additionally or alternatively, this radiation may reach the entrance window after one or more reflections, such as reflections at a mirror positioned nearby the luminescent body. Hence, in embodiments the lighting system may further comprise a first reflective surface, especially configured parallel to one or more side faces, and configured at a first distance from the luminescent body, wherein the first reflective surface is configured to reflect at least part of the converter radiation that escapes from the one or more side faces back into the luminescent body or to the optical element. The space between the reflective surface and the one or more side faces comprises a gas, wherein the gas comprises air. The first distance may e.g. be in the range of 0.1 µm-20 mm, such as in the range of 1-10 mm, like 2 µm-10 mm.

Especially, the distance is at least wavelength of interest, more especially at least twice the wavelength of interest. Further, as there may be some contact, e.g. for holding purposes or for distance holder purposes, especially an average distance is at least $\lambda_i$, such as at least $1.5*\lambda_i$, like at least $2*\lambda_i$, such as especially about $5*\lambda_i$, wherein $\lambda_i$ is the wavelength of interest. Especially, however, the average distance is in embodiments not larger than 50 µm, such as not larger than 25 µm, like not larger than 20 µm, like not larger than 10 µm, for purposes of good thermal contact. Likewise, such average minimum distance may apply to a reflector and/or optical filter configured at e.g. an end face, or other optical components as well. Optionally, in embodiments an element may comprise both heat sinking function a reflection function, such as a heat sink with a reflective surface, or a reflector functionally coupled to a heat sink.

The lighting system may be configured to provide blue, green, yellow, orange, or red light, etc. Alternatively or additionally, in embodiments, the lighting system may (also) be configured to provide one or more of UV, such as near UV (especially in the range of 320-400 nm), and IR, such as near IR (especially in the range of 750-3000 nm). Further, in specific embodiment, the lighting system may be configured to provide white light. If desired, monochromaticity may be improved using optical filter(s). The definitions of near UV and near infrared may partly overlap with the generally used definition for visible light, which is 380-780 nm.

The term "light concentrator" or "luminescent concentrator" is herein used, as one or more light sources irradiate a relatively large surface (area) of the light converter, and a lot of converter radiation may escape from a relatively small area (exit window) of the light converter. Thereby, the specific configuration of the light converter provides its light concentrator properties. Especially, the light concentrator may provide Stokes-shifted light, which is Stokes shifted relative to the pump radiation. Hence, the term "luminescent concentrator" or "luminescent element" may refer to the same element, especially an elongated light transmissive body (comprising a luminescent material), wherein the term "concentrator" and similar terms may refer to the use in combination with one or more light sources and the term "element" may be used in combination with one or more, including a plurality, of light sources. When using a single light source, such light source may e.g. be a laser, especially a solid state laser (like a LED laser). The elongated light transmissive body comprises a luminescent material and can herein especially be used as luminescent concentrator. The elongated light transmissive body is herein also indicated as "luminescent body". Especially, a plurality of light sources may be applied.

The terms "upstream" and "downstream" relate to an arrangement of items or features relative to the propagation of the light from a light generating means (here the especially the light source(s)), wherein relative to a first position within a beam of light from the light generating means, a second position in the beam of light closer to the light generating means is "upstream", and a third position within the beam of light further away from the light generating means is "downstream".

The light concentrator comprises a light transmissive body. The light concentrator is especially described in relation to an elongated light transmissive body, such as a ceramic rod or a crystal, such as a single crystal. However, these aspects may also be relevant for other shaped ceramic bodies or single crystals. In specific embodiments, the luminescent body comprises a ceramic body or single crystal.

The light transmissive body has light guiding or wave guiding properties. Hence, the light transmissive body is herein also indicated as waveguide or light guide. As the light transmissive body is used as light concentrator, the light transmissive body is herein also indicated as light concentrator. The light transmissive body will in general have (some) transmission of one or more of (N)UV, visible and (N)IR radiation, such as in embodiments at least visible light, in a direction perpendicular to the length of the light transmissive body. Without the activator (dopant) such as trivalent cerium, the internal transmission in the visible might be close to 100%.

The transmission of the light transmissive body for one or more luminescence wavelengths may be at least 80%/cm, such as at least 90%/cm, even more especially at least 95%/cm, such as at least 98%/cm, such as at least 99%/cm. This implies that e.g. a 1 cm³ cubic shaped piece of light transmissive body, under perpendicular irradiation of radiation having a selected luminescence wavelength (such as a wavelength corresponding to an emission maximum of the luminescence of the luminescent material of the light transmissive body), will have a transmission of at least 95%.

Herein, values for transmission especially refer to transmission without taking into account Fresnel losses at interfaces (with e.g. air). Hence, the term "transmission" especially refers to the internal transmission. The internal transmission may e.g. be determined by measuring the transmission of two or more bodies having a different width over which the transmission is measured. Then, based on such measurements the contribution of Fresnel reflection losses and (consequently) the internal transmission can be determined. Hence, especially, the values for transmission indicated herein, disregard Fresnel losses.

In embodiments, an anti-reflection coating may be applied to the luminescent body, such as to suppress Fresnel reflection losses (during the light incoupling process).

In addition to a high transmission for the wavelength(s) of interest, also the scattering for the wavelength(s) may especially be low. Hence, the mean free path for the wavelength of interest only taking into account scattering effects (thus not taking into account possible absorption (which should be low anyhow in view of the high transmission), may be at least 0.5 times the length of the body, such as at least the length of the body, like at least twice the length of the body. For instance, in embodiments the mean free path only taking into account scattering effects may be at least 5 mm, such as at least 10 mm. The wavelength of interest may especially be the wavelength at maximum emission of the luminescence of the luminescent material. Hence, the mean free path for the wavelength of interest is especially the mean free path for the emitted light at wavelength of interest, which may be the wavelength at maximum emission (in the visible). The term "mean free path" is especially the average distance a ray will travel before experiencing a scattering event that will change its propagation direction. Especially, the mean free path (mfp) for scattering of a sample can be determined from a measurement of the in-line transmission $T\_i$ in a wavelength region where essentially no absorption is present (e.g. ca. 650 nm for the discussed garnets) as $mfp=-h/\ln(T\_i/T\_F)$, where h is the sample thickness and $T\_F=1-R\_F$, where $R\_F$ is the Fresnel reflection at the two sample surfaces.

Hence, in embodiments the mean free path (only taking into account scattering effects) for the wavelength of interest is at least 0.5 times the length (L) of the elongated luminescent body, wherein the wavelength of interest is the wavelength at maximum emission of the converter light of the luminescent material. Instead of the term "converter light" also the terms "emission" or "luminescence" may be applied.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to visible light.

The term UV radiation may in specific embodiments refer to near UV radiation (NUV). Therefore, herein also the term "(N)UV" is applied, to refer to in general UV, and in specific embodiments to NUV. The term IR radiation may in specific embodiments refer to near IR radiation (NIR). Therefore, herein also the term "(N)IR" is applied, to refer to in general IR, and in specific embodiments to NIR.

Herein, the term "visible light" especially relates to light having a wavelength selected from the range of 380-780 nm. The transmission can be determined by providing light at a specific wavelength with a first intensity to the light transmissive body under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989).

The light transmissive body may have any shape, such as beam (or bar) like or rod like, however especially beam like (cuboid like). The light transmissive body, such as the luminescent concentrator, might be hollow, like a tube, or might be filled with another material, like a tube filled with water or a tube filled with another solid light transmissive medium. The invention is not limited to specific embodiments of shapes, neither is the invention limited to embodiments with a single exit window or outcoupling face. Below, some specific embodiments are described in more detail. Would the light transmissive body have a circular cross-section, then the width and height may be equal (and may be defined as diameter). Especially, however, the light transmissive body has a cuboid like shape, such as a bar like shape, and is further configured to provide a single exit window.

In a specific embodiment, the light transmissive body may especially have an aspect ratio larger than 1, i.e. the length is larger than the width. In general, the light transmissive body is a rod, or bar (beam), or a rectangular plate, though the light transmissive body does not necessarily have a square, rectangular or round cross-section. In general, the light source is configured to irradiate one (or more) of the longer faces (side edge), herein indicated as radiation input face, and radiation escapes from a face at a front (front edge), herein indicated as radiation exit window. The light source(s) may provide radiation to one or more side faces, and optionally an end face. Hence, there may be more than one radiation input face.

Especially, in embodiments the solid state light source, or other light source, is not in (direct) physical contact with the light transmissive body.

Physical contact (between the light exit window(s) of the light source(s) and the light entrance window(s) of the light transmissive body/bodies) may lead to undesired outcoupling (from the light transmissive body) and thus a reduction in concentrator efficiency. Hence, especially there is substantially no physical contact. If the actual contact area is kept small enough, the optical impact may be negligible or at least acceptable. Therefore, it may be perfectly acceptable to have some physical contact, e.g. by some small points as resulting from a certain surface roughness, or non-perfectly flat surface, or by some intentionally created "highest spots" on a surface that will define a certain average distance between the two surfaces that don't extract substantial amounts of light while enabling a short average distance.

Further, in general the light transmissive body comprises two substantially parallel faces, a radiation input face and opposite thereof the opposite face. These two faces define herein the width of the light transmissive body. In general, the length of these faces defines the length of the light transmissive body. However, as indicated above, and also below, the light transmissive body may have any shape, and may also include combinations of shapes. Especially, the radiation input face has an radiation input face area (A), wherein the radiation exit window has a radiation exit window area (E), and wherein the radiation input face area (A) is at least 1.5 times, even more especially at least two times larger than the radiation exit window area (E), especially at least 5 times larger, such as in the range of 2-50,000, especially 5-5,000 times larger. Hence, especially the elongated light transmissive body comprises a geometrical concentration factor, defined as the ratio of the area of the radiation input faces and the area of the radiation exit window, of at least 1.5, such as at least 2, like at least 5, or much larger (see above). This allows e.g. the use of a plurality of solid state light sources (see also below). For typical applications like in automotive, digital projectors, or high brightness spot light applications, a small but high radiant flux or luminous flux emissive surface is desired. This cannot be obtained with a single LED, but can be obtained with the present lighting system. Especially, the radiation exit window has a radiation exit window area (E) selected from the range of 1-100 mm². With such dimensions, the emissive surface can be small, whereas nevertheless high radiance or luminance may be achieved. As indicated above, the light transmissive body in general has an aspect ratio (of length/width). This allows a small radiation exit surface, but a large radiation input surface, e.g. irradiated with a plurality of solid state light sources. In a specific embodiment, the light transmissive body has a height (H) selected from the range of 0.5-100 mm, such as 0.5-10 mm. The light transmissive body is thus especially an integral body, having the herein indicated faces.

The generally rod shaped or bar shaped light transmissive body can have any cross sectional shape, but in embodiments has a cross section the shape of a square, rectangle, round, oval, triangle, pentagon, or hexagon. Generally the ceramic or crystal bodies are cuboid. In specific embodiments, the body may be provided with a different shape than a cuboid, with the light input surface having somewhat the shape of a trapezoid. By doing so, the light flux may be even enhanced, which may be advantageous for some applications. Hence, in some instances (see also above) the term "width" may also refer to diameter, such as in the case of a light transmissive body having a round cross section. Hence, in embodiments the elongated light transmissive body further has a height (H) and a height (H), with especially L>W and L>H. Especially, the first face and the second face define the length, i.e. the distance between these faces is the length of the elongated light transmissive body. These faces may especially be arranged parallel. Further, in a specific embodiment the length (L) is at least 2 cm, like 3-20 cm, such as 4-20 cm, such as at maximum 15 cm. Other dimensions may, however, also be possible, such as e.g. 0.5-2 cm.

Especially, the light transmissive body has a height (H) selected to absorb more than 95% of the light source light. In embodiments, the light transmissive body has a height (H) selected from the range of 0.03-4 cm, especially 0.05-2 cm, such as 0.1-1.5 cm, like 0.1-1 cm. With the herein indicated cerium concentration, such width is enough to absorb substantially all light (especially at the excitation wavelength with maximum excitation intensity) generated by the light sources.

The light transmissive body may also be a cylindrically shaped rod. In embodiments the cylindrically shaped rod has one flattened surface along the longitudinal direction of the rod and at which the light sources may be positioned for efficient incoupling of light emitted by the light sources into the light transmissive body. The flattened surface may also be used for placing heatsinks. The cylindrical light transmissive body may also have two flattened surfaces, for example located opposite to each other or positioned perpendicular to each other. In embodiments the flattened surface extends along a part of the longitudinal direction of the cylindrical rod. Especially however, the edges are planar and configured perpendicular to each other.

The side face is especially such flattened surface(s). The flattened surface especially has a relatively low surface roughness, such as a Ra of at maximum 100 nm, such as in the range of 5-100 nm, like up to 50 nm.

The light transmissive body may also comprise a tube or a plurality of tubes. In embodiments, the tube (or tubes) may be filled with a gas, like air or another gas having higher heat conductivity, such as helium or hydrogen, or a gas comprising two or more of helium, hydrogen, nitrogen, oxygen and carbon dioxide. In embodiments, the tube (or tubes) may be filled with a liquid, such as water or (another) cooling liquid.

The light transmissive body as set forth below in embodiments according to the invention may also be folded, bended and/or shaped in the length direction such that the light transmissive body is not a straight, linear bar or rod, but may comprise, for example, a rounded corner in the form of a 90 or 180 degrees bend, a U-shape, a circular or elliptical shape, a loop or a 3-dimensional spiral shape having multiple loops. This provides for a compact light transmissive body of which the total length, along which generally the light is guided, is relatively large, leading to a relatively high lumen output, but can at the same time be arranged into a relatively small space. For example, luminescent parts of the light transmissive body may be rigid while transparent parts of the light transmissive body are flexible to provide for the shaping of the light transmissive body along its length direction. The light sources may be placed anywhere along the length of the folded, bended and/or shaped light transmissive body.

Parts of the light transmissive body that are not used as light incoupling area or light exit window may be provided with a reflector. Hence, in an embodiment the lighting system further comprises a reflector configured to reflect luminescent material radiation back into the light transmissive body. Therefore, the lighting system may further include one or more reflectors, especially configured to reflect radiation back into the light transmissive body that escapes from one or more other faces than the radiation exit window. Especially, a face opposite of the radiation exit window may include such reflector, though in an embodiment not in physical contact therewith. Hence, the reflectors may especially not be in physical contact with the light transmissive body. Therefore, in an embodiment the lighting system further comprises an optical reflector (at least) configured downstream of the first face and configured to reflect light back into the elongated light transmissive body. Alternatively or additionally, optical reflectors may also be arranged at other faces and/or parts of faces that are not used to couple light source light in or luminescence light out. Especially, such optical reflectors may not be in physical contact with the light transmissive body. Further, such optical reflector(s) may be configured to reflect one or more of the luminescence and light source light back into the light transmissive body. Hence, substantially all light source light may be reserved for conversion by the luminescent material (i.e. the activator element(s) such as especially $Ce^{3+}$) and a substantial part of the luminescence may be reserved for outcoupling from the radiation exit window. The term "reflector" may also refer to a plurality of reflectors.

The one or more reflectors may consist of a metal reflector, such as a thin metal plate or a reflective metal layer deposited on a substrate, such as e.g. glass. The one or more reflectors may consist of an optical transparent body containing optical structure to reflect (part) of the light such as prismatic structures. The one or more reflectors may consist of specular reflectors. The one or more reflectors may contain microstructures, such as prism structures or saw tooth structures, designed to reflect the light rays towards a desired direction.

Preferably, such reflectors are also present in the plane where the light sources are positioned, such that that plane consist of a mirror having openings, each opening having the same size as a corresponding light source allowing the light of that corresponding light source to pass the mirror layer and enter the elongated (first) light transmissive body while light that traverses from the (first) light transmissive body in the direction of that plane receives a high probability to hit the mirror layer and will be reflected by that mirror layer back towards the (first) light transmissive body.

The terms "coupling in" and similar terms and "coupling out" and similar terms indicate that light changes from medium (external from the light transmissive body into the light transmissive body, and vice versa, respectively). In general, the light exit window will be a face (or a part of a face), configured (substantially) perpendicular to one or more other faces of the waveguide. In general, the light transmissive body will include one or more body axes (such as a length axis, a width axis or a height axis), with the exit window being configured (substantially) perpendicular to such axis. Hence, in general, the light input face(s) will be configured (substantially) perpendicular to the light exit window. Thus, the radiation exit window is especially configured perpendicular to the one or more radiation input faces. Therefore, especially the face comprising the light exit window does not comprise a light input face.

For further improving efficiency and/or for improving the spectral distribution several optical elements may be included like mirrors, optical filters, additional optics, etc.

In specific embodiments, the lighting system may have a mirror configured at the first face configured to reflect light back into the elongated light transmissive body, and/or may have one or more of an optical filter, a (wavelength selective) mirror, a reflective polarizer, light extraction structures, and a collimator configured at the second face. At the second face the mirror may e.g. be a wavelength selective mirror or a mirror including a hole. In the latter embodiment, light may be reflected back into the body but part of the light may escape via the hole. Especially, in embodiments the optical element may be configured at a distance of about 0.01-1 mm, such as 0.1-1 mm from the body. This may especially apply for e.g. mirrors, wherein optical coupling is not desired.

When optical coupling is desired, such as with an optical element, like a CPC or a mixing element, downstream of the (part of the) body where the luminescent material is located, an optically transparent interface material may be applied. In yet other embodiments, when no optically transparent interface material is applied, the average distance between two elements being in optical contact may especially be about at maximum the wavelength of relevance, such as the wavelength of an emission maximum. Hence, when optical contact is desired, there may be physical contact. Even in such embodiments, there may be a non-zero average distance, but then equal to or lower than the wavelength of interest.

In specific embodiments, especially when no optical contact is desired, the average distance may be as indicated above but at a few places, for instance for configuration purposes, there may be physical contact. For instance, there may be contact with the edge faces over less than 10%, such as over less than 5% of the total area of the side faces. Hence, the minimum average distance may be as defined e.g. above and if there is physical contact, this physical contact may be with at maximum 10% of the surface area of the surface with which the element (mirror and/or heat sink) is in physical contact, such as at maximum 5%, like at maximum 2%, even more especially at maximum 1%. For instance, for the side faces an average distance may e.g. be between ca 2 and 10 μm (the lower limit basically determined as being a few times the wavelength of interest; here, assuming e.g. visible light). This may be achieved by having physical contact (to secure that distance) over less than 1% of the total area of that respective side face.

For instance, a heat sink or a reflector, or the relevant surface may have some protrusions, like a surface roughness, by which there may be contact between the surface and the element, but in average the distance is at least $\lambda_i$ (or more, see also above)(in order to essentially prevent optical contact), but there is physical contact with equal to or less than 10% of the surface of the body (to which the element may be thermally coupled and/or optically not coupled), especially substantially less.

In embodiments, optical elements may be included at one or more of the side faces. In particular, anti-reflection coatings may be applied to enhance coupling efficiency of the (excitation) light source light and/or (wavelength selective) reflection coatings for the converted light.

Downstream of the radiation exit window, optionally an optical filter may be arranged. Such optical filter may be used to remove undesired radiation. For instance, when the lighting system should provide red light, all light other than red may be removed. Hence, in a further embodiment the lighting system further comprises an optical filter configured downstream of the radiation exit window and configured to reduce the relative contribution of undesired light in the converter radiation (downstream of the radiation exit window). For filtering out light source light, optionally an interference filter may be applied.

In yet a further embodiment, the lighting system further comprises a collimator configured downstream of the radiation exit window (of the highest order luminescent concentrator) and configured to collimate the converter radiation. Such collimator, like e.g. a CPC (compound parabolic concentrator), may be used to collimate the light escaping from the radiation exit window and to provide a collimated or pre-collimated beam of light. Herein, the terms "collimated", "precollimated" and similar terms may especially refer to a light beam having a solid angle (substantially) smaller than 2n.

As indicated above, the lighting system may comprise a plurality of light sources. This plurality of light sources may be configured to provide light source light to a single side or face or to a plurality of faces; see further also below. When providing light to a plurality of faces, in general each face will receive light of a plurality of light sources (a subset of the plurality of light sources). Hence, in embodiments a plurality of light sources will be configured to provide light source light to a radiation input face. Also this plurality of light sources will in general be configured in a row or a plurality of rows. Hence, the light transmissive body is elongated, the plurality of light sources may be configured in a row, which may be substantially parallel to the axis of elongated of the light transmissive body. The row of light sources may have substantially the same length as the elongated light transmissive body. Hence, in the light transmissive body has a length (L) in the range of about 80-120% of the second length (L2) of the row of light sources; or the row of light sources has a length in the range of about 80-120% of the length of the light transmissive body.

The light sources may be configured to provide light with a wavelength selected from the range of UV (including near UV), visible, and infrared (including near IR).

Especially, the light sources are light sources that during operation emit (light source light) at least light at a wavelength selected from the range of 200-490 nm, especially light sources that during operation emit at least light at wavelength selected from the range of 360-490 nm, such as 400-490 nm, even more especially in the range of 430-490 nm, such as 440-490 nm, such as at maximum 480 nm. This light may partially be used by the luminescent material. Hence, in a specific embodiment, the light source is configured to generate blue light. In a specific embodiment, the light source comprises a solid state light source (such as a LED or laser diode). The term "light source" may also relate to a plurality of light sources, such as e.g. 2-2000, such as 2-500, like 2-100, e.g. at least 4 light sources, such as in embodiments especially 4-80 (solid state) light sources, though many more light sources may be applied. Hence, in embodiments 4-500 light sources may be applied, like e.g. 8-200 light sources, such as at least 10 light sources, or even at least 50 light sources. The term "light source" may also relate to one or more light sources that are tailored to be applied for such light concentrating luminescent concentrators, e.g. one or more LED's having a long elongated radiating surface matching the long elongated light input surfaces of the elongated luminescent concentrator. Hence, the term LED may also refer to a plurality of LEDs. Hence, as indicated above, the term "solid state light source" may also refer to a plurality of solid state light sources. In an embodiment (see also below), these are substantially identical solid state light sources, i.e. providing substantially identical spectral distributions of the solid state light source radiation. In embodiments, the solid state light sources may be configured to irradiate different faces of the light transmissive body. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB ("printed circuit board") or comparable. Hence, a plurality of semiconductor light sources may be configured on the same substrate. In embodiments, a COB is a multi LED chip configured together as a single lighting module.

The lighting system comprises a plurality of light sources. Especially, the light source light of the plurality (m) of light sources have spectral overlap, even more especially, they are of the same type and provide substantial identical light (having thus substantial the same spectral distribution). Hence, the light sources may substantially have the same emission maximum ("peak maximum"), such as within a bandwidth of 10 nm, especially within 8 nm, such as within 5 nm (e.g. obtained by binning) However, in yet other embodiments, the lighting system may comprise a single light source, especially a solid state light source having a relatively large die. Hence, herein also the phrase "one or more light sources" may be applied.

In embodiments, there may be two or more different luminescent materials, such as e.g. when applying two or more different light transmissive bodies. In such embodiments, the light sources may comprise light sources with two or more different emission spectra enabling excitation of two different luminescent materials. Such two or more different light sources may belong to different bins.

The light sources are especially configured to provide a blue optical power ($W_{opt}$) of at least 0.2 Watt/mm$^2$ to the light transmissive body, i.e. to the radiation input face(s). The blue optical power is defined as the energy that is within the energy range that is defined as blue part of the spectrum (see also below). Especially, the photon flux is in average at least $4.5*10^{17}$ photons/(s·mm$^2$), such as at least $6.0*10^{17}$ photons/(s·mm$^2$). Assuming blue (excitation) light, this may e.g. correspond to a blue power ($W_{opt}$) provided to at least one of the radiation input faces of in average at least 0.067 Watt/mm$^2$ and 0.2 Watt/mm$^2$, respectively. Here, the term "in average" especially indicates an average over the area (of the at least one of the radiation input surfaces). When more than one radiation input surface is irradiated, then especially each of these radiation input surfaces receives such photon flux. Further, especially the indicated photon flux (or blue power when blue light source light is applied) is also an average over time.

In yet a further embodiment, especially for (DLP (digital light processing)) projector applications, the plurality of light sources is operated in pulsed operation with a duty cycle selected from the range of 10-80%, such as 25-70%.

In yet a further embodiment, especially for (LCD or DLP) projector applications using dynamic contrast technologies, such as e.g. described in WO0119092 or USRE42428 (E1), the plurality of light sources is operated in video signal content controlled PWM pulsed operation with a duty cycle selected from the range of 0.01-80%, such as 0.1-70%.

In yet a further embodiment, especially for (LCD or DLP) projector applications using dynamic contrast technologies, such as e.g. described in US patent WO0119092 or U.S. Pat. No. 6,631,995 (B2), the plurality of light sources is operated in video signal content controlled intensity modulated operation with intensity variations selected from the range of 0.1-100%, such as 2-100%.

The lighting system may comprise a plurality of luminescent concentrators, such as in the range of 2-50, like 2-20 light concentrators (which may e.g. be stacked).

The light concentrator may radiationally be coupled with one or more light sources, especially a plurality of light sources, such as 2-1000, like 2-50 light sources. The term "radiationally coupled" especially means that the light source and the light concentrator are associated with each other so that at least part of the radiation emitted by the light source is received by the light concentrator (and at least partly converted into luminescence). Instead of the term "luminescence" also the terms "emission" or "emission radiation" may be applied.

Hence, the luminescent concentrator receives at one or more radiation input faces radiation (pump radiation) from an upstream configured light concentrator or from upstream configured light sources. Further, the light concentrator comprises a luminescent material configured to convert at least part of a pump radiation received at one or more radiation input faces into luminescent material radiation, and the luminescent concentrator configured to couple at least part of the luminescent material radiation out at the radiation exit window as converter radiation. This converter radiation is especially used as component of the lighting system light.

The phrase "configured to provide luminescent material radiation at the radiation exit window" and similar phrases especially refers to embodiments wherein the luminescent material radiation is generated within the luminescent concentrator (i.e. within the light transmissive body), and part of the luminescent material radiation will reach the radiation exit window and escape from the luminescent concentrator. Hence, downstream of the radiation exit window the luminescent material radiation is provided. The converter radiation, downstream of the radiation exit window comprises at least the luminescent material radiation escaped via the radiation exit window from the light converter. Instead of the term "converter radiation" also the term "light concentrator light" may be used. Pump radiation can be applied to a single radiation input face or a plurality of radiation input faces.

In embodiments, the length (L) is selected from the range of 1-100 cm, such as especially 2-50 cm, like at least 3 cm, such as 5-50 cm, like at maximum 30 cm. This may thus apply to all luminescent concentrators. However, the range indicates that the different luminescent concentrators may have different lengths within this range.

In yet further embodiments, the elongated light transmissive body (of the luminescent concentrator) comprises an elongated ceramic body. For instance, luminescent ceramic garnets doped with $Ce^{3+}$ (trivalent cerium) can be used to convert blue light into light with a longer wavelength, e.g. within the green to red wavelength region, such as in the range of about 500-750 nm, or even in the cyan. To obtain sufficient absorption and light output in desired directions, it is advantageous to use transparent rods (especially substantially shaped as beams). Such rod can be used as light concentrator, converting light source light into converter radiation and providing at an exit surface (a substantial amount of) (concentrated) converter radiation. Lighting systems based on light concentrators may e.g. be of interest for projector applications. For projectors, red, yellow, green and blue luminescent concentrators are of interest. Green and/or yellow luminescent rods, based on garnets, can be relatively efficient. Such concentrators are especially based on YAG: Ce (i.e. $Y_3Al_5O_{12}:Ce^{3+}$) or LuAG, which can be indicated as $(Y_{1-x}Lu_x)_3Al_5O_{12}:Ce^{3+}$, where $0 \leq x \leq 1$, such as in embodiments $Lu_3Al_5O_{12}:Ce^{3+}$. 'Red' garnets can be made by doping a YAG-garnet with Gd ("YGdAG"). Cyan emitters can be made by e.g. replacing (part of the) Al (in e.g. LuAG) by Ga (to provide "LuGaAG"). Blue luminescent concentrators can be based on YSO ($Y_2SiO_5:Ce^{3+}$) or similar compounds or BAM ($BaMgAl_{10}O_{17}:Eu^{2+}$) or similar compounds, especially configured as single crystal(s). The term similar compounds especially refer to compounds having the same crystallographic structure but where one or more cations are at least partially replaced with another cation (e.g. Y replacing with Lu and/or Gd, or Ba replacing with Sr). Optionally, also anions may be at least partially replaced, or cation-anion combinations, such as replacing at least part of the Al—O with Si—N.

Hence, especially the elongated light transmissive body comprises a ceramic material configured to wavelength convert at least part of the (blue) light source light into converter radiation in e.g. one or more of the green, yellow and red, which converter radiation at least partly escapes from the radiation exit window.

In embodiments, the ceramic material especially comprises an $A_3B_5O_{12}:Ce^{3+}$ ceramic material ("ceramic garnet"), wherein A comprises yttrium (Y) and/or lutetium (Lu) and/or gadolinium (Gd), and wherein B comprises aluminum (Al) and/or gallium (Ga), especially at least Al. As further indicated below, A may also refer to other rare earth elements and B may include Al only, but may optionally also include gallium. The formula $A_3B_5O_{12}:Ce^{3+}$ especially indicates the chemical formula, i.e. the stoichiometry of the different type of elements A, B and O (3:5:12). However, as known in the art the compounds indicated by such formula may optionally also include a small deviation from stoichiometry.

In yet a further aspect, the invention also provides such elongated light transmissive body per se, i.e. an elongated light transmissive body having a first face and a second face, these faces especially defining the length (L) of the elongated light transmissive body, the elongated light transmissive body comprising one or more radiation input faces and a radiation exit window, wherein the second face comprises the radiation exit window, wherein the elongated light transmissive body comprises a ceramic material configured to wavelength convert at least part of (blue) light source light into converter radiation, such as (at least) one or more of green, yellow, and red converter radiation (which at least partly escapes from the radiation exit window when the elongated light transmissive body is irradiated with blue light source light), wherein the ceramic material comprises an $A_3B_5O_{12}:Ce^{3+}$ ceramic material as defined herein. Such light transmissive body can thus be used as light converter. Especially, such light transmissive body has the shape of a cuboid.

As indicated above, in embodiments the ceramic material comprises a garnet material. However, also other (crystallographic) cubic systems may be applied. Hence, the elongated body especially comprises a luminescent ceramic. The garnet material, especially the ceramic garnet material, is herein also indicated as "luminescent material". The luminescent material comprises an $A_3B_5O_{12}:Ce^{3+}$ (garnet material), wherein A is especially selected from the group consisting of Sc, Y, Tb, Gd, and Lu (especially at least Y and/or Lu, and optionally Gd), wherein B is especially selected from the group consisting of Al and Ga (especially at least Al). More especially, A (essentially) comprises (i) lutetium (Lu), (ii) yttrium, (iii) yttrium (Y) and lutetium (Lu), (iv) gadolinium (Gd), optionally in combination with one of the aforementioned, and B comprises aluminum (Al) or gallium (Ga) or a combination of both. Such garnet is be doped with cerium (Ce), and optionally with other luminescent species such as praseodymium (Pr).

As indicated above, the element A may especially be selected from the group consisting of yttrium (Y) and gadolinium (Gd). Hence, $A_3B_5O_{12}:Ce^{3+}$ especially refers to $(Y_{1-x}Gd_x)_3B_5O_{12}:Ce^{3+}$, wherein especially x is in the range of 0.1-0.5, even more especially in the range of 0.2-0.4, yet even more especially 0.2-0.35. Hence, A may comprise in the range of 50-90 atom % Y, even more especially at least 60-80 atom % Y, yet even more especially 65-80 atom % of A comprises Y. Further, A comprises thus especially at least 10 atom % Gd, such as in the range of 10-50 atom % Gd, like 20-40 atom %, yet even more especially 20-35 atom % Gd.

Especially, B comprises aluminum (Al), however, B may also partly comprise gallium (Ga) and/or scandium (Sc) and/or indium (In), especially up to about 20% of Al, more especially up to about 10% of Al may be replaced (i.e. the A ions essentially consist of 90 or more mole % of Al and 10 or less mole % of one or more of Ga, Sc and In); B may especially comprise up to about 10% gallium. Therefore, B may comprise at least 90 atom % Al. Hence, $A_3B_5O_{12}:Ce^{3+}$ especially refers to $(Y_{1-x}Gd_x)_3Al_5O_{12}:Ce^{3+}$, wherein especially x is in the range of 0.1-0.5, even more especially in the range of 0.2-0.4.

In another variant, B (especially Al) and O may at least partly be replaced by Si and N. Optionally, up to about 20% of Al—O may be replaced by Si—N, such as up to 10%.

For the concentration of cerium, the indication n mole % Ce indicates that n % of A is replaced by cerium. Hence, $A_3B_5O_{12}:Ce^{3+}$ may also be defined as $(A_{1-n}Ce_n)_3B_5O_{12}$, with n being in the range of 0.001-0.036, such as 0.0015-0.01. Therefore, a garnet essentially comprising Y and mole Ce may in fact refer to $((Y_{1-x}Gd_x)_{1-n}Ce_n)_3B_5O_{12}$, with x and n as defined above.

Especially, the ceramic material is obtainable by a sintering process and/or a hot pressing process, optionally followed by an annealing in an (slightly) oxidizing atmosphere. The term "ceramic" especially relates to an inorganic material that is—amongst others—obtainable by heating a (poly crystalline) powder at a temperature of at least 500° C., especially at least 800° C., such as at least 1000° C., like at least 1400° C., under reduced pressure, atmospheric pressure or high pressure, such as in the range of $10^{-8}$ to 500 MPa, such as especially at least 0.5 MPa, like especially at least 1 MPa, like 1 to about 500 MPa, such as at least 5 MPa, or at least 10 MPa, especially under uniaxial or isostatic pressure, especially under isostatic pressure. A specific method to obtain a ceramic is hot isostatic pressing (HIP), whereas the HIP process may be a post-sinter HIP, capsule HIP or combined sinter-HIP process, like under the temperature and pressure conditions as indicate above. The ceramic obtainable by such method may be used as such, or may be further processed (like polishing). A ceramic especially has density that is at least 90% (or higher, see below), such as at least 95%, like in the range of 97-100%, of the theoretical density (i.e. the density of a single crystal). A ceramic may still be polycrystalline, but with a reduced, or strongly reduced volume between grains (pressed particles or pressed agglomerate particles). The heating under elevated pressure, such as HIP, may e.g. be performed in an inert gas, such as comprising one or more of $N_2$ and argon (Ar). Especially, the heating under elevated pressures is preceded by a sintering process at a temperature selected from the range of 1400-1900° C., such as 1500-1800° C. Such sintering may be performed under reduced pressure, such as at a pressure of $10^{-2}$ Pa or lower. Such sintering may already lead to a density of in the order of at least 95%, even more especially at least 99%, of the theoretical density. After both the pre-sintering and the heating, especially under elevated pressure, such as HIP, the density of the light transmissive body can be close to the density of a single crystal. However, a difference is that grain boundaries are available in the light transmissive body, as the light transmissive body is polycrystalline. Such grain boundaries can e.g. be detected by optical microscopy or SEM. Hence, herein the light transmissive body especially refers to a sintered polycrystalline having a density substantially identical to a single crystal (of the same material). Such body may thus be highly transparent for visible light (except for the absorption by the light absorbing species such as especially $Ce^{3+}$).

The luminescent concentrator may also be a crystal, such as a single crystal. Such crystals can be grown/drawn from the melt in a higher temperature process. The large crystal, typically referred to as boule, can be cut into pieces to form the light transmissive bodies. The polycrystalline garnets mentioned above are examples of materials that can alternatively also be grown in single crystalline form.

After obtaining the light transmissive body, the body may be polished. Before or after polishing an annealing process (in an oxidative atmosphere) may be executed, especially before polishing. In a further specific embodiment, the annealing process lasts for at least 2 hours, such as at least 2 hours at at least 1200° C. Further, especially the oxidizing atmosphere comprises for example O2.

The lighting system may further comprise a cooling element in thermal contact with the luminescent concentrator. The cooling element can be a heatsink or an actively cooled element, such as a Peltier element. Further, the cooling element can be in thermal contact with the light transmissive body via other means, including heat transfer via air or with an intermediate element that can transfer heat, such as a thermal grease. Especially, however, the cooling element is in physical contact with the light transmissive body. The term "cooling element" may also refer to a plurality of (different) cooling elements.

Hence, the lighting system may include a heatsink configured to facilitate cooling of the solid state light source and/or luminescent concentrator. The heatsink may comprise or consist of copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof. Alternatively or additionally, the heatsink may comprise or consist of aluminum oxide. The term "heatsink" may also refer to a plurality of (different) heatsink. The lighting system may further include one or more cooling elements configured to cool the light transmissive body. With the present invention, cooling elements or heatsinks may be used to cool the light transmissive body and the same or different cooling elements or heatsinks may be used to cool the light sources. The cooling elements or heatsinks may also provide interfaces to further cooling means or allow cooling transport to dissipate the heat to the ambient. For instance, the cooling elements or heatsinks may be connected to heat pipes or a water cooling systems that are connect to more remotely placed heatsinks or may be directly cooled by air flows such as generated by fans. Both passive and active cooling may be applied.

In specific embodiments, there is no physical contact between the heat sink (or cooling elements) and the light transmissive body. Especially, the average is at least the intensity averaged wavelength of light that is transmitted by luminescence of luminescent material. In embodiments, the average between the light transmissive body and the heatsink or cooling element is at least 1 µm, such as at least 2 µm, like at least 5 µm. Further, for a good heat transfer the average distance between the light transmissive body and the heatsink or cooling elements is not larger than 50 µm, such as not larger than 25 µm, like not larger than 20 µm, such as equal to or smaller than 15 µm, like at maximum 10 µm.

Therefore, in embodiments the lighting system may further comprise a heat sink having an average distance to the elongated light transmissive body of at least 1 µm, such as at least 2 µm, like especially at least 5 µm, or wherein the heat dissipating element is in physical contact with at maximum 10%, such as at maximum 5% of a total area of the side face(s) of the elongated light transmissive body. The average is thus especially not larger than 50 µm. Instead of the term "heat sink" also the term cooling element may be applied.

In particular embodiments, the elongated luminescent concentrator is clamped between 2 metal plates or clamped within a housing consisting of a highly thermal conductive material such way that a sufficient air gap between the elongated luminescent concentrator remains present to provide TIR (total internal reflection) of the light trapped within the elongated luminescent concentrator while a sufficient amount of heat may traverse from the elongated luminescent concentrator through the air gap towards the highly thermal conductive housing. The thickness of the air gap is higher than the wavelength of the light, e.g. higher than 0.1 µm, e.g. higher 0.5 µm. The elongated luminescent concentrator is secured in the housing by providing small particles between the elongated luminescent concentrator and the housing, such as small spheres or rods having a diameter higher than 0.1 µm, e.g. higher 0.5 µm, like at least 1 µm, such as at least 5 µm, especially equal to or smaller than 20 µm, such as equal to or smaller than 10 µm (see also above defined average). Alternatively, the elongated luminescent concentrator may be secured in the housing by providing some surface roughness on the surfaces of the highly thermal conductive housing touching the elongated luminescent concentrator, the surface roughness varying over a depth higher than 0.1 µm, e.g. higher 0.5 µm, preferably equal to or smaller than about 10 µm.

The density of such spheres, rods or touch points of a rough surface of the highly thermal conductive housing is relatively very small, such that most of the surface area of the elongated light transmissive body remains untouched securing a high level of TIR reflections within of the light trapped within the elongated light transmissive body.

The lighting system may thus essentially consist of the elongated light transmissive body comprising a luminescent material and one or more, especially a plurality of light sources, which pump the luminescent material to provide luminescent material light, that escapes from a radiation exit window (of an end face (second face)).

Further, the lighting system may comprise an optical element, such as a CPC or (other) extraction optical element, which may be configured downstream of the light transmissive body, but which in embodiments may be integrated with the light transmissive body.

Optionally, between this optical element and the light transmissive body, a radiation mixing element may be configured. Hence, a section of the light transmissive body of an additional element may be configured that acts as an optical mixing rod (preferably not round, but e.g. hexagonal) between the converters and the CPC (or extraction optical element). Alternatively or additionally, the extraction optical element is designed such that it also mixes the light.

Further, the lighting system may comprise one or more holding elements for holding the light transmissive body. Especially, these holding elements have contact with the edge faces, but only with a small part thereof to minimize losses of light. For instance, the holding element(s), like clamping device (s) have contact with the edge faces over less than 10%, such as over less than 5% of the total area of the side faces. Further, the lighting system may comprise a heat sink and/or a cooling element. The holding element(s) may be comprised by the heat sink and/or cooling element.

The lighting system may be part of or may be applied in e.g. office lighting systems, household application systems, shop lighting systems, home lighting systems, accent lighting systems, spot lighting systems, theater lighting systems, architectural lighting, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, or LCD backlighting, etc. The lighting system may also be part of or may be applied in e.g. material curing systems, additive manufacturing systems, metrology systems, UV sterilization system, (IR) imaging systems, fiber illumination systems, etc. In an aspect, the invention also provides a projection system or a luminaire comprising the lighting system as described herein, or a plurality of such lighting systems.

In an aspect, the invention also provides a projection system or a luminaire comprising the system as defined herein.

In yet a further aspect, the invention also provides the system as defined herein for use as a light source in (fluorescence) microscopy and endoscopy, and thus also provides a (fluorescence) microscope or endoscope comprising such system.

In yet a further aspect, the invention provides a projector comprising the lighting system as defined herein. As indicated above, of course the light projector may also include a plurality of such lighting systems.

Here, the term "lighting system" may also be used for a (digital) projector. Further, the lighting system may be used for e.g. stage lighting (see further also below), or architectural lighting, or be applied in a (fluorescence) microscopy or endoscopy lighting system. Therefore, in embodiments the invention also provides a lighting system as defined herein, wherein the lighting system comprises a digital projector, a stage lighting system or an architectural lighting system. The lighting system may comprise one or more lighting systems as defined herein and optionally one or more second lighting systems configured to provide second lighting system light, wherein the lighting system light comprises (a) one or more of (i) the converter radiation as defined herein, and optionally (b) second lighting system light. Hence, the invention also provides a lighting system configured to provide visible light, wherein the lighting system comprises at least one lighting system as defined herein. For instance, such lighting system may also comprise one or more (additional) optical elements, like one or more of optical filters, collimators, reflectors, wavelength converters, lens elements, etc. The lighting system may be, for example, a lighting system for use in an automotive application, like a headlight. Hence, the invention also provides an automotive lighting system configured to provide visible light, wherein the automotive lighting system comprises at least one lighting system as defined herein and/or a digital projector system comprising at least one lighting system as defined herein. Especially, the lighting system may be configured (in such applications) to provide red light. The automotive lighting system or digital projector system may also comprise a plurality of the lighting systems as described herein.

Alternatively, the lighting system may be designed to provide high intensity UV radiation, e.g. for 3D printing technologies or UV sterilization applications. Alternatively, the lighting system may be designed to provide a high intensity IR light beam, e.g., to project IR images for (military) training purposes.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL, such as within about 3 SDCM from the BBL.

The terms "violet light" or "violet emission" especially relates to light having a wavelength in the range of about 380-440 nm. The terms "blue light" or "blue emission" especially relates to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-570 nm. The terms "orange light" or "orange emission" especially relate to light having a wavelength in the range of about 570-600. The terms "red light" or "red emission" especially relate to light having a wavelength in the range of about 600-780 nm. The term "pink light" or "pink emission" refers to light having a blue and a red component. The terms "visible", "visible light" or "visible emission" refer to light having a wavelength in the range of 380-780 nm. The term UV light may be UV-A (315-400 nm); UV-B (280-315 nm) or UV-C (200-280 nm). The term IR light may be light in the range above 780 nm. The term "white light" may in embodiments refer to light consisting of particular spectral compositions of wavelengths in the range between 380-780 nm, perceived nearby Planck's black body radiators having temperatures of about 1000 K and above.

The elongated light transmissive body, and optionally also the optical element, may comprise light transmissive host material (thus not taking into account the luminescent material, or more especially in embodiments a luminescent species such as trivalent cerium), especially light transparent material for one or more wavelengths in the visible, such as in the green and red, and in general also in the blue. Suitable host materials may comprise one or more materials selected from the group consisting of a transmissive organic material, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethylene terephthalate (PET), including in an embodiment (PETG) (glycol modified polyethylene terephthalate), PDMS (polydimethylsiloxane), and COC (cyclo olefin copolymer). Especially, the light transmissive material may comprise an aromatic polyester, or a copolymer thereof, such as e.g. polycarbonate (PC), poly (methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN); especially, the light transmissive material may comprise polyethylene terephthalate (PET). Hence, the light transmissive material is especially a polymeric light transmissive material.

However, in another embodiment the light transmissive material may comprise an inorganic material. Especially, the inorganic light transmissive material may be selected from the group consisting of glasses, (fused) quartz, transmissive ceramic materials (such as garnets), and silicones. Glass ceramic materials may also be applied. Also hybrid materials, comprising both inorganic and organic parts may be applied. Especially, the light transmissive material comprises one or more of PMMA, transparent PC, or glass.

When a luminescent material, like an inorganic luminescent material, quantum dots, organic molecules, etc., are embedded in a host matrix, the concentration of the luminescent material may in embodiments be selected from the range of 0.01-5 wt % (weight %), such as 0.01-2 wt %.

High brightness light sources may be used in e.g. front projectors, rear projectors, studio lighting, stage lighting, entertainment lighting, automotive front lighting, architectural lighting, augmented illumination (incl. data/content), microscopy, metrology, medical applications, e.g. digital pathology, etc.

Instead of $A_3B_5O_{12}$, the invention may also be applied with another cerium comprising material, such as e.g. $M_2SiO_5:Ce^{3+}$, wherein M refers to one or more elements selected from the group of lanthanides and yttrium, especially wherein M comprises one or more of Y, La, Gd, and Lu. All embodiments described herein may also be applied in relation to such luminescent material.

Hence, in an aspect the invention provides also lighting device comprising (i) lighting system comprising: (i) a light source configured to provide light source light; (ii) an elongated luminescent body having a length (L), the elongated luminescent body comprising (iia) a plurality of side faces over at least part of the length (L), wherein the side faces comprise a first side face, comprising a radiation input face, and a second side face configured parallel to the first side face, wherein the side faces define a height (H), wherein the elongated luminescent body further comprises a radiation exit window bridging at least part of the height (H) between the first side face and the second side face; (iib) a $M_2SiO_5$ type luminescent material comprising trivalent cerium, with a height dependent concentration, especially in embodiments selected from a concentration range defined by a minimum concentration $y_{min}=0.036*x^{-1}$ and a maximum concentration $y_{max}=0.17*x^{-1}$, wherein y is the trivalent cerium concentration in % relative to the M element, and wherein h is the height (H) in mm, wherein the $M_2SiO_5$ type luminescent material is configured to convert at least part of the light source light into converter light, wherein M refers to one or more elements selected from the group of lanthanides and yttrium, especially wherein M comprises one or more of Y, La, Gd, and Lu; (iii) one or more heat transfer elements in thermal contact with one or more side faces; and (iv) a reflector configured at the second side face and configured to reflect light source light escaping from the elongated luminescent body via second face back into the elongated luminescent body. Especially, M=Y.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

A light emitting device according to the invention may be used in applications including but not being limited to a lamp, a light module, a luminaire, a spot light, a flash light, a projector, a (digital) projection device, automotive lighting such as e.g. a headlight or a taillight of a motor vehicle, arena lighting, theater lighting and architectural lighting.

Light sources which are part of the embodiments according to the invention as set forth below, may be adapted for, in operation, emitting light with a first spectral distribution. This light is subsequently coupled into a light guide or waveguide; here the light transmissive body. The light guide or waveguide may convert the light of the first spectral distribution to another spectral distribution and guides the light to an exit surface.

Figure 1A:
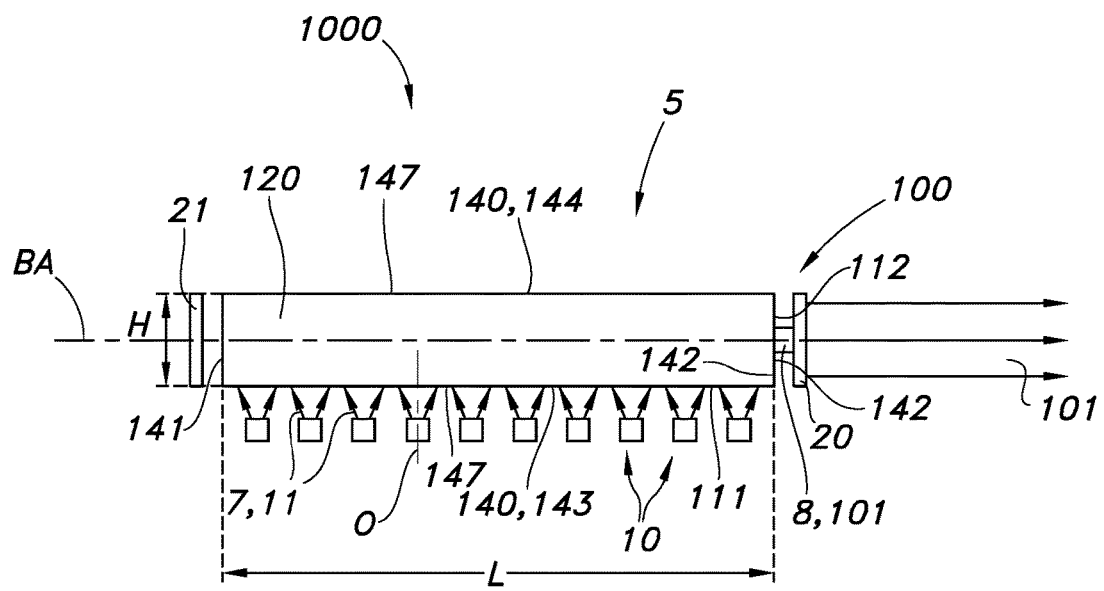
FIGS. 1a-1e schematically depict some aspects of the invention.

An embodiment of the lighting system as defined herein is schematically depicted in FIG. 1a. FIG. 1a schematically depicts a lighting system 1000 comprising a plurality of solid state light sources 10 and a luminescent concentrator 5 comprising an elongated light transmissive body 100 having a first face 141 and a second face 142 defining a length L of the elongated light transmissive body 100. The elongated light transmissive body 100 comprising one or more radiation input faces 111, here by way of example two oppositely arranged faces, indicated with references 143 and 144 (which define e.g. the height H), which are herein also indicated as edge faces or edge sides 147. Further the light transmissive body 100 comprises a radiation exit window 112, wherein the second face 142 comprises the radiation exit window 112. The entire second face 142 may be used or configured as radiation exit window. The plurality of solid state light sources 10 are configured to provide (blue) light source light 11 to the one or more radiation input faces 111. As indicated above, they especially are configured to provide to at least one of the radiation input faces 111 a blue power $W_{opt}$ of in average at least 0.067 Watt/mm². Reference BA indicates a body axis, which will in cuboid embodiments be substantially parallel to the edge sides 147. Reference 140 refers to side faces or edge faces in general.

In embodiments herein, the radiation exit window 112, which may in embodiments be essentially identical to the second face 142 may be configured under an angle (or angles) with the one or more side faces 140 of essentially 90°.

The elongated light transmissive body 100 may comprise a ceramic material 120 configured to wavelength convert at least part of the (blue) light source light 11 into converter light 101, such as at least one or more of green and red converter light 101. As indicated above the ceramic material 120 comprises an $A_3B_5O_{12}$:Ce³⁺ ceramic material, wherein A comprises e.g. one or more of yttrium (Y), gadolinium (Gd) and lutetium (Lu), and wherein B comprises e.g. aluminum (Al). References 20 and 21 indicate an optical filter and a reflector, respectively. The former may reduce e.g. non-green light when green light is desired or may reduce non-red light when red light is desired. The latter may be used to reflect light back into the light transmissive body or waveguide, thereby improving the efficiency. Note that more reflectors than the schematically depicted reflector may be used. Note that the light transmissive body may also essentially consist of a single crystal, which may in embodiments also be $A_3B_5O_{12}$:Ce³⁺.

The light sources may in principle be any type of light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs, or a combination of any of these. The LED may in principle be an LED of any color, or a combination of these, but is in an embodiment a blue light source producing light source light in the UV and/or blue color-range which is defined as a wavelength range of between 380 nm and 490 nm. In another embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

The light sources 10 are configured to provide light source light 11, which is used as pump radiation 7. The luminescent material 120 converts the light source light into luminescent material light 8 (see also FIG. 1e). Light escaping at the light exit window is indicated as converter light 101, and will include luminescent material light 8. Note that due to reabsorption part of the luminescent material light 8 within the luminescent concentrator 5 may be reabsorbed. Hence, the spectral distribution may be redshifted relative e.g. a low doped system and/or a powder of the same material. The lighting system 1000 may be used as luminescent concentrator to pump another luminescent concentrator.

Figure 1B:
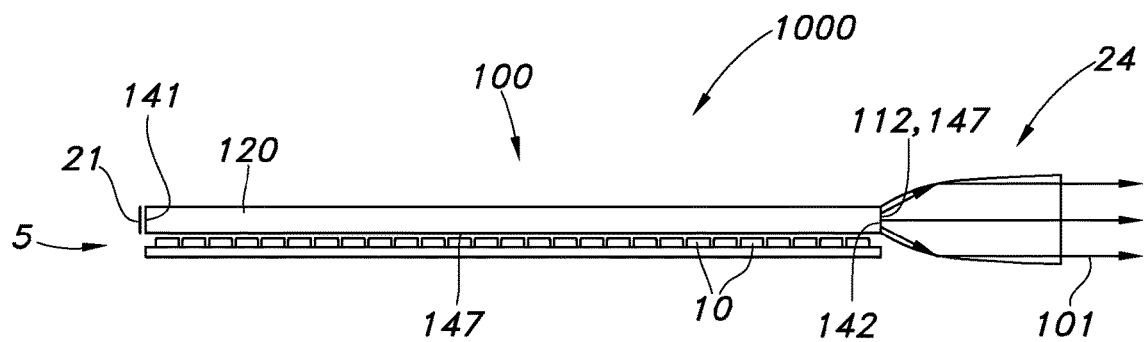

FIGS. 1a-1b schematically depict similar embodiments of the lighting system. Further, the lighting system may include further optical elements, either separate from the waveguide and/or integrated in the waveguide, like e.g. a light concentrating element, such as a compound parabolic light concentrating element (CPC). The lighting systems 1 in FIG. 1b further comprise a collimator 24, such as a CPC.

As shown in FIGS. 1a-1b and other Figures, the light guide has at least two ends, and extends in an axial direction between a first base surface (also indicated as first face 141) at one of the ends of the light guide and a second base surface (also indicated as second face 142) at another end of the light guide.

Figure 1C:
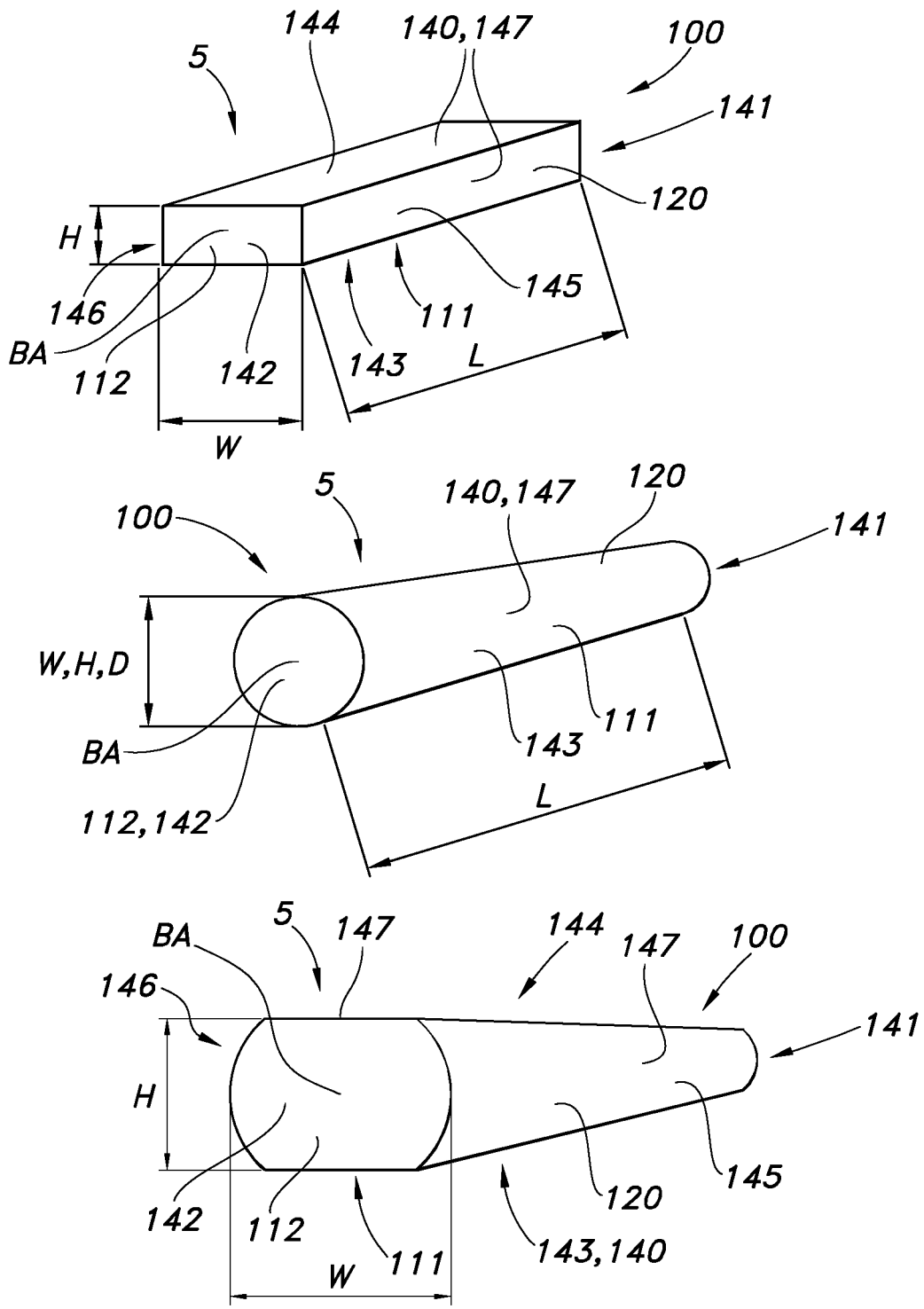

FIG. 1c schematically depicts some embodiments of possible ceramic bodies or crystals as waveguides or luminescent concentrators. The faces are indicated with references 141-146. The first variant, a plate-like or beam-like light transmissive body has the faces 141-146. Light sources, which are not shown, may be arranged at one or more of the faces 143-146 (general indication of the edge faces is reference 147). The second variant is a tubular rod, with first and second faces 141 and 142, and a circumferential face 143. Light sources, not shown, may be arranged at one or more positions around the light transmissive body. Such light transmissive body will have a (substantially) circular or round cross-section. The third variant is substantially a combination of the two former variants, with two curved and two flat side faces. In the embodiment having a circular cross-section the number of side faces may be considered unlimited (∞).

In the context of the present application, a lateral surface of the light guide should be understood as the outer surface or face of the light guide along the extension thereof. For example in case the light guide would be in form of a cylinder, with the first base surface at one of the ends of the light guide being constituted by the bottom surface of the cylinder and the second base surface at the other end of the light guide being constituted by the top surface of the cylinder, the lateral surface is the side surface of the cylinder. Herein, a lateral surface is also indicated with the term edge faces or side 140.

The variants shown in FIG. 1c are not limitative. More shapes are possible; i.e. for instance referred to WO2006/054203, which is incorporated herein by reference. The ceramic bodies or crystals, which are used as light guides, generally may be rod shaped or bar shaped light guides comprising a height H, a width W, and a length L extending in mutually perpendicular directions and are in embodiments transparent, or transparent and luminescent. The light is guided generally in the length L direction. The height H is in embodiments <10 mm, in other embodiments <5 mm, in yet other embodiments <2 mm. The width W is in embodiments <10 mm, in other embodiments <5 mm, in yet embodiments <2 mm. The length L is in embodiments larger than the width W and the height H, in other embodiments at least 2 times the width W or 2 times the height H, in yet other embodiments at least 3 times the width W or 3 times the height H. Hence, the aspect ratio (of length/width) is especially larger than 1, such as equal to or larger than 2, such as at least 5, like even more especially in the range of 10-300, such as 10-100, like 10-60, like 10-20. Unless indicated otherwise, the term "aspect ratio" refers to the ratio length/width. FIG. 1c schematically depicts an embodiment with four long side faces, of which e.g. two or four may be irradiated with light source light.

The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

Note that in all embodiments schematically depicted herein, the radiation exit window is especially configured perpendicular to the radiation input face(s). Hence, in embodiments the radiation exit window and radiation input face(s) are configured perpendicular. In yet other embodiments, the radiation exit window may be configured relative to one or more radiation input faces with an angle smaller or larger than 90°.

Note that, in particular for embodiments using a laser light source to provide light source light, the radiation exit window might be configured opposite to the radiation input face(s), while the mirror or reflector 21 may consist of a mirror having a hole to allow the laser light to pass the mirror while converted light has a high probability to reflect at mirror or reflector 21. Alternatively or additionally, a mirror may comprise a dichroic mirror. Reflector 21 may especially be configured to reflect luminescent material light back into the elongated luminescent body 100.

Figure 1D:
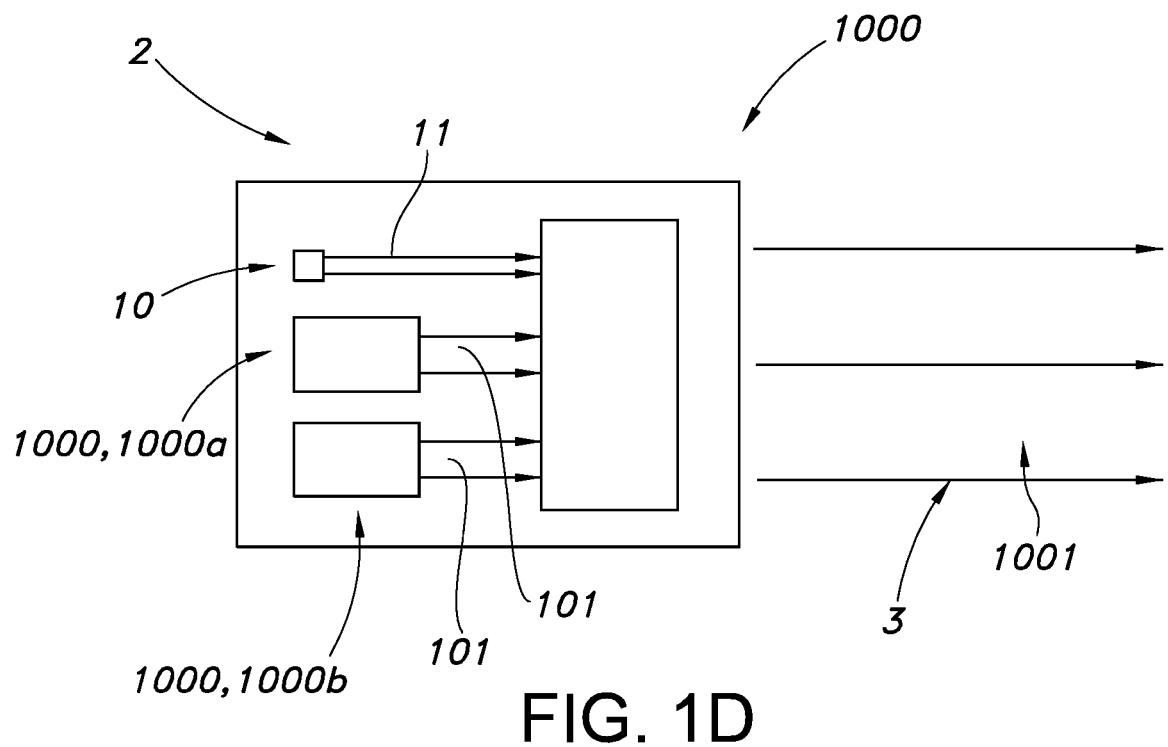

FIG. 1d very schematically depicts a projector or projector device 2 comprising the lighting system 1000 as defined herein. By way of example, here the projector 2 comprises at least two lighting systems 1000, wherein a first lighting system 1000a is configured to provide e.g. green light 101 and wherein a second lighting system 1000b is configured to provide e.g. red light 101. Light source 10 is e.g. configured to provide blue light. These light sources may be used to provide the projection (light) 3. Note that the additional light source 10, configured to provide light source light 11, is not necessarily the same light source as used for pumping the luminescent concentrator(s). Further, here the term "light source" may also refer to a plurality of different light sources. The projector device 2 is an example of a lighting system 1000, which lighting system is especially configured to provide lighting system light 1001, which will especially include lighting system light 101.

High brightness light sources are interesting for various applications including spots, stage-lighting, headlamps and digital light projection.

Figure 1E:
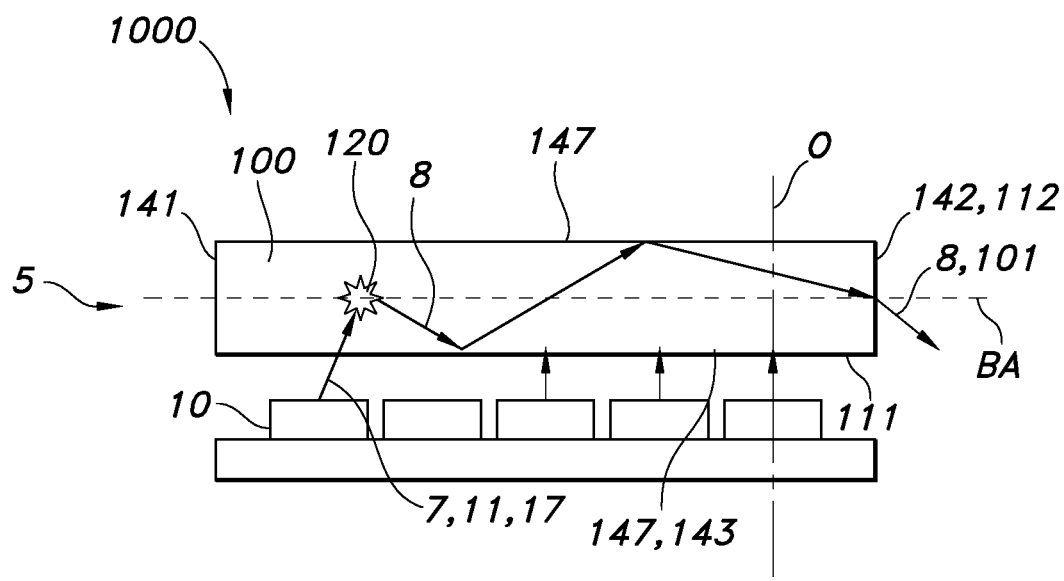

For this purpose, it is possible to make use of so-called luminescent concentrators where shorter wavelength light is converted to longer wavelengths in a highly transparent luminescent material. A rod of such a transparent luminescent material can be used and then it is illuminated by LEDs to produce longer wavelengths within the rod. Converted light which will stay in the luminescent material such as a doped garnet in the waveguide mode and can then be extracted from one of the surfaces leading to an intensity gain (FIG. 1e).

High-brightness LED-based light source for beamer applications appear to be of relevance. For instance, the high brightness may be achieved by pumping a luminescent concentrator rod by a discrete set of external blue LEDs, whereupon the phosphor that is contained in the luminescent rod subsequently converts the blue photons into green or red photons. Due to the high refractive index of the luminescent rod host material (typically 1.8) the converted green or red photons are almost completely trapped inside the rod due to total internal reflection. At the exit facet of the rod the photons are extracted from the rod by means of some extraction optics, e.g. a compound parabolic concentrator (CPC), or a micro-refractive structure (micro-spheres or pyramidal structures). As a result the high luminescent power that is generated inside the rod can be extracted at a relatively small exit facet, giving rise to a high source brightness, enabling (1) smaller optical projection architectures and (2) lower cost of the various components because these can be made smaller (in particular the, relatively expensive, projection display panel).

Figure 2A:
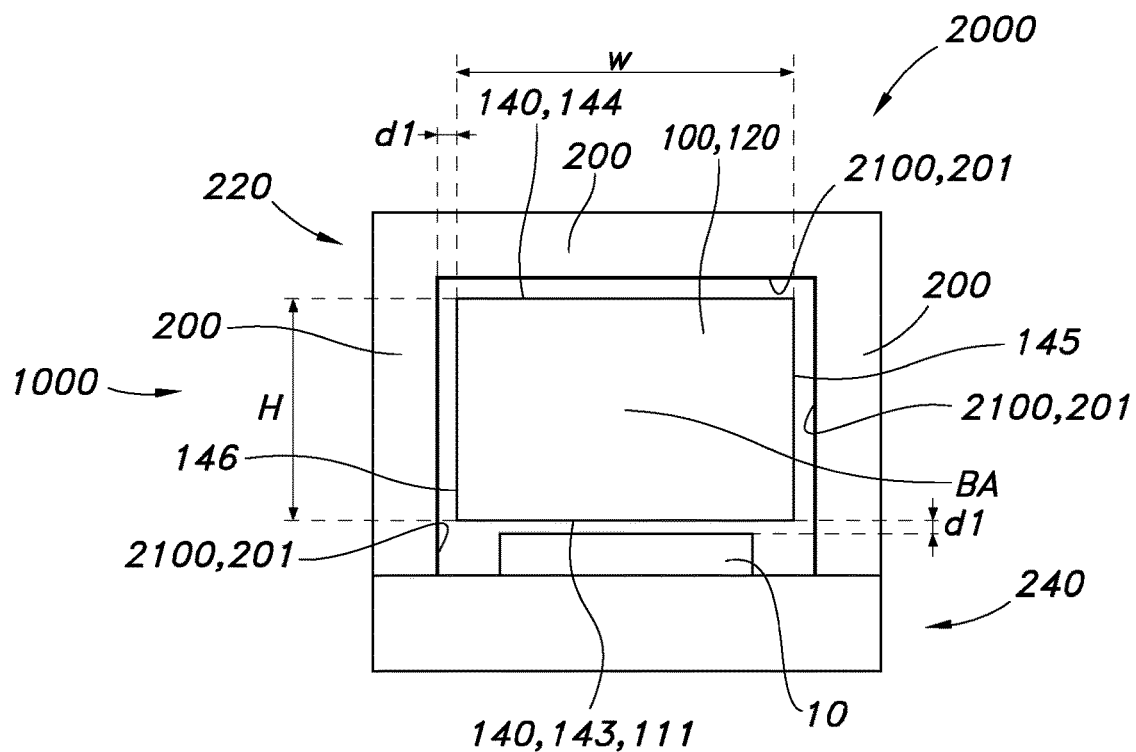
FIG. 2a schematically shows an embodiment of a cross section of configuration with single-sided illumination of luminescent rod. The inner sides of the cooling block(s) may be made reflective or covered by a mirror.
Figure 2B:
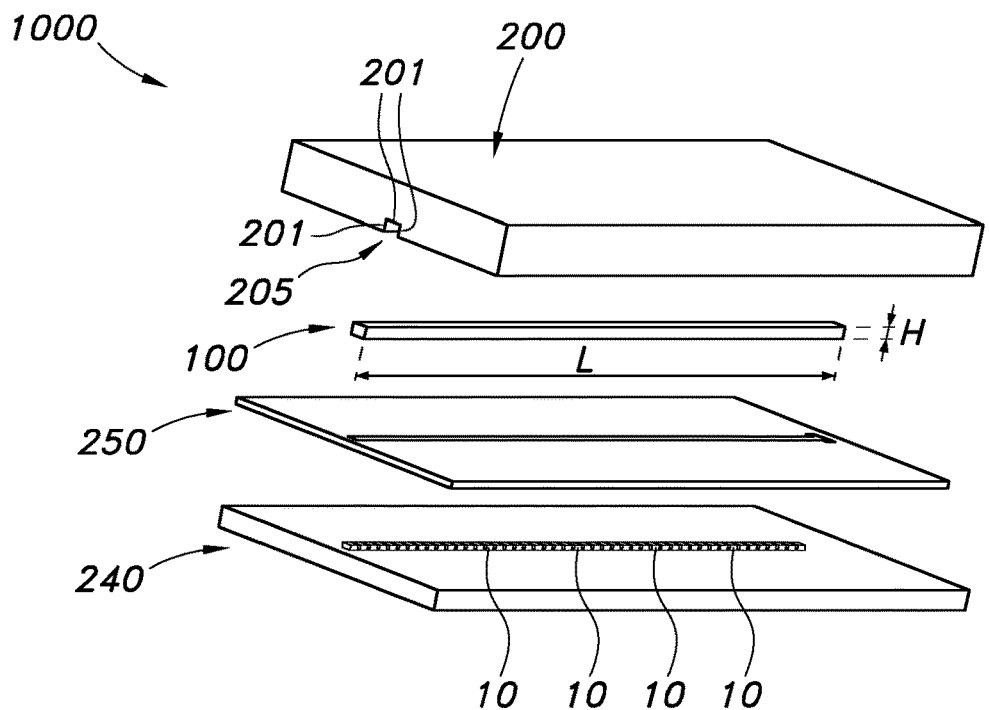
FIG. 2b provides a schematic representation of single-sided concept.

FIGS. 2a-2b schematically depict embodiments of a lighting system 1 comprising a light source 10 configured to provide light source light 11 and an elongated luminescent body 100 having a length L (see FIG. 2b).

As indicated above, the elongated luminescent body 100 comprises (n) side faces 140, here 4, over at least part of the length. The (n) side faces 140 comprise a first side face 143, comprising a radiation input face 111, and a second side face 144 configured parallel to the first side face 143, wherein the side faces 143, 144 define a height h.

As indicated above, the elongated luminescent body 100 further comprises a radiation exit window bridging at least part of the height h between the first side face 143 and the second side face 144 (see especially FIG. 1a). The luminescent body 100 comprises a garnet type $A_3B_5O_{12}$ luminescent material 120 comprising trivalent cerium, wherein the garnet type $A_3B_5O_{12}$ luminescent material 120 is configured to convert at least part of the light source light 11 into converter light 101.

Further, the lighting system 1000 comprises one or more heat transfer elements 200 in thermal contact with one or more side faces 140 and a reflector 2100 configured at the second side face 144 and configured to reflect light source light 11 escaping from the elongated luminescent body 100 via second face 144 back into the elongated luminescent body 100.

The one or more heat transfer elements 200 are especially configured parallel to at least part of one or more of the side faces 140 over at least part of the length of the elongated luminescent body 100 at a shortest distance (d1) from the respective one or more side faces 140. The shortest distance d1 is especially 1 µm≤d1≤100 µm.

As shown in FIGS. 2a-2b, the one or more heat transfer elements 200 comprise one or more heat transfer element faces 201 directed to one or more side faces 140. As shown in these schematic drawings, the one or more heat transfer elements 200 are at least in thermal contact with all side faces 140 other than the first side face 143. Further, as also shown in these schematic drawings, the one or more heat transfer elements 200 may be configured as a monolithic heat transfer element 220. In embodiments, this monolithic heat transfer element 220 is configured in thermal contact with a support 240 for the light source 10.

A heat transfer element face 201 of the one or more heat transfer element 200 directed to the second face 144 comprises the reflector 2100. Here, all faces 201 directed to the luminescent body 100 comprise such reflector 2100.

FIG. 2b schematically depict another embodiment of the monolithic heat transfer element 220, including a slit 205 configured to host the luminescent body 100. The light sources 10 may be provided as LED bar. The monolithic heat transfer element 220 is used for cooling of the luminescent body 100.

The optional intermediate plate, indicated with reference 250, may serve as a spacer to keep the luminescent body at the desired distance from the light sources and may also serve as a reflector for the light that escapes from the luminescent body side faces. As an alternative, the spacer could be integrated with the one or more heat transfer element 200, especially a top one or more heat transfer element 200 (such as a top cooling block).

In FIGS. 2a-2b, the one or more heat transfer elements are configured within a circle section of at least 180°, here in fact about 270°.

The availability of the reflector 2100, such as in embodiments comprised by or provided to a heat transfer element 200 may, especially when configured opposite of the light source 10 with the elongated luminescent body in between, reflect light source light that may have escaped from the elongated luminescent body 100 back therein. As the optical axis of the light source may especially be configured perpendicular to the side face of the elongated (in case of a rod with circular cross-section) or perpendicular to one of the side faces (in case of e.g. a rod with a rectangular cross-section), light source light may escape from an opposite (part of the) side face.

Figure 3A:
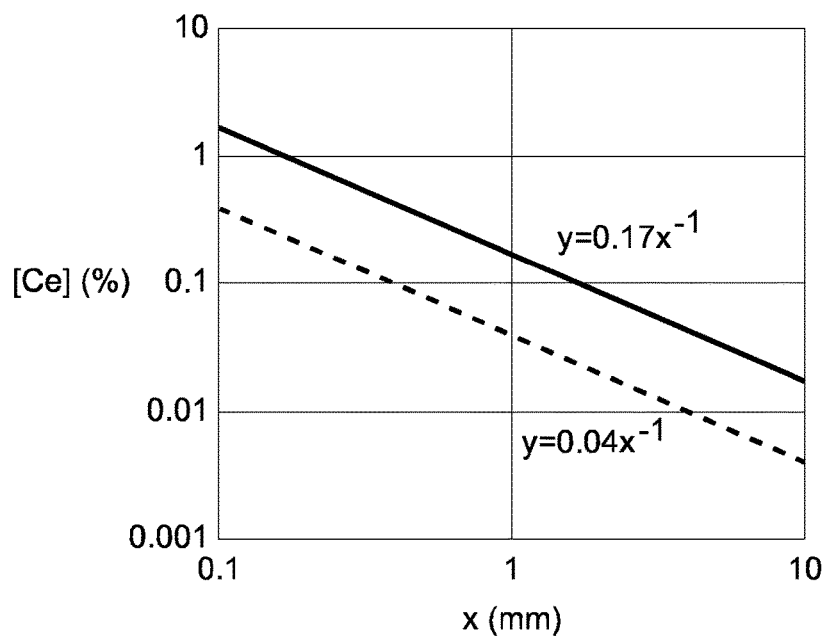
FIG. 3a shows the cerium concentration in cerium comprising $A_3B_5O_{12}$ garnets vs. thickness for obtaining 90% (lowest curve) or 99% absorption (highest curve) as a function of thickness in a single-sided configuration. The Ce concentration is especially in the region between the two lines.

As shown in FIG. 3a, the luminescent body has a height dependent concentration, which may especially be selected from a concentration range defined by a minimum concentration $y_{min}=0.036*x^{-1}$ and a maximum concentration $y_{max}=0.17*x^{-1}$, wherein y is the trivalent cerium concentration in % relative to the A element, and wherein x is the height or diameter in mm. Here, in FIG. 2c the embodiment is shown wherein the height dependent concentration is selected from a concentration range defined by a minimum concentration $y_{min}=0.036*x^{-1}$ and a maximum concentration $y_{max}=0.17*x^{-1}$.

FIG. 3a especially relates to luminescent material comprising an $A_3B_5O_{12}:Ce^{3+}$ (garnet material), wherein A is especially selected from the group consisting of Sc, Y, Tb, Gd, and Lu (especially at least Y and/or Lu, and optionally Gd), wherein B is especially selected from the group consisting of Al and Ga (especially at least Al). For LuAG, YAG, YGdAG, and YGaAG the absorption coefficients at the respective excitation maxima around about 460 nm are essentially the same.

Figure 3B:
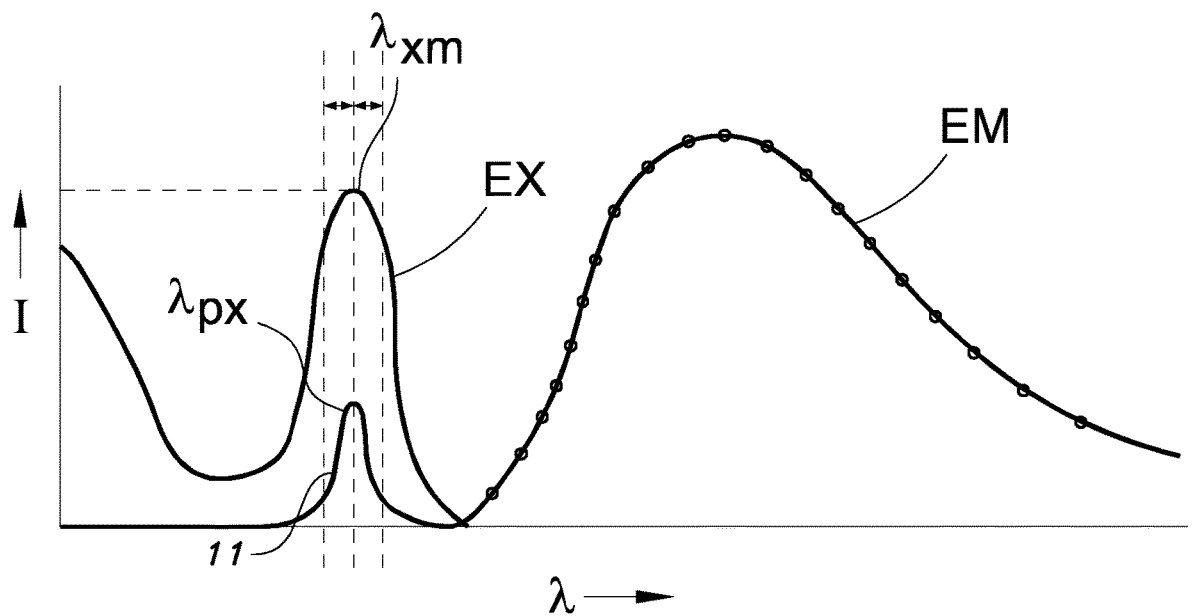
FIG. 3b schematically depicts some aspects of excitation, emission, and light source emission; the vertical dashed lines e.g. depicted e.g. the +/−10 nm range around the maximum of the excitation.

FIG. 3b very schematically depicts an excitation spectrum, left curve, indicated with EX, with excitation maximum $\lambda_{xm}$, and emission spectrum, right curve, indicated with EM. The light source emission, such as an emission of a LED is indicated with light source light 11, which has a maximum $\lambda_{px}$. In specific embodiments, $\lambda_{xm}-5$ nm≤$\lambda_{px}$≤$\lambda_{xm}+5$ nm. The maximum of the emission curve is the emission maximum. The wavelength at maximum emission is herein also indicated as "wavelength at maximum emission of the converter light of the luminescent material". For the garnets, this maximum may e.g. be in the green-yellow wavelength range.

Hence, as indicated above, the top of the excitation maximum only slightly varies for the different types of garnets, and all of LuAG, YAG, YGdAG, and YGaAG comply with the formula's as e.g. indicated in FIG. 3a.

In the formula, x may also be the diameter in mm. In embodiments wherein the elongated luminescent body has a cross-sectional shape other than circular or rectangular (including square), or anyhow more in general, x may refer to the length through the elongated luminescent body along the optical axis of a light source. Especially, the optical axis of the light source is configured perpendicular to one of the one or more side faces. Hence, referring to FIGS. 1a and 2a, x refers to the height H. referring to FIG. 1c, in the top and bottom embodiment, x may also refer to the height H, assuming irradiation from below or from the top. In the middle embodiment, i.e. the embodiment wherein the cross-sectional shape is circular, x refers to the diameter D (or to the width or height, as these all are the same).

Note that terms as height and width are essentially only labels. Would e.g. the elongated luminescent body 100 in FIG. 2a be configured differently, such as with light source 10 directed to a smaller side face (e.g. luminescent body rotated over 90°), the x may refer to the width. For instance, referring to FIG. 1c.

In FIG. 2a, the three of the plurality of side faces 140 are in thermal contact with one or more heat transfer elements 200. Hence, at least 50% of the total area of the one or more side faces 140 may be in thermal contact with one or more heat transfer elements 200. This might also apply when the elongated luminescent body 100 has another shape, such as having a circular cross-section.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting system comprising:
   a plurality of light sources configured to provide light source light at a wavelength selected from the range of 360 nm-490 nm;
   an elongated luminescent body having a length (L), and a height or diameter (H), the elongated luminescent body having light guiding properties, and the elongated luminescent body comprising:
      at least three side faces over at least part of the length (L), including a radiation input face, and a radiation exit window (112) bridging at least part of the height or diameter (H);
      a garnet type $A_3B_5O_{12}$ luminescent material including trivalent cerium, with a height dependent concentration selected from a concentration range defined by a minimum concentration $y_{min}=0.036*x^{-1}$ and a maximum concentration $y_{max}=0.17*x^{-1}$, wherein y is the trivalent cerium concentration in mole % relative to the A element, and wherein x is the height or diameter (H) in mm, wherein the garnet type $A_3B_5O_{12}$ luminescent material is configured to convert at least part of the light sources light into converter light;
   one or more heat transfer elements in thermal contact with at least one of the side faces; and
   a reflector configured to reflect light sources light escaping from the elongated luminescent body back into the elongated luminescent body, wherein the elongated luminescent body is configured between the light source and the reflector.

2. The lighting system according to claim 1, wherein the minimum concentration $y_{min}=0.04*x^{-l}$.

3. The lighting system according to claim 1, wherein A comprises one or more of yttrium, gadolinium and lutetium, and wherein B comprises one or more of aluminum and gallium.

4. The lighting system (1000) according to claim 1, wherein A=Lu and wherein B=Al, or wherein A comprises Y and Lu, and wherein B=Al.

5. The lighting system according to claim 1, elongated luminescent body comprises a ceramic body or single crystal, and wherein the mean free path for the wavelength of interest is at least 0.5 times the length (L) of the elongated luminescent body, wherein the wavelength of interest is the wavelength at maximum emission of the converter light of the luminescent material.

6. The lighting system according to claim 1, wherein the one or more heat transfer elements are configured parallel to at least part of one or more of the side faces over at least part of the length (L) of the elongated luminescent body at a shortest distance (d1) from the respective one or more side faces with 1 µm≤d1≤100 µm.

7. The lighting system according to claim 1, wherein the reflector comprises a specular mirror or a diffuse reflector.

8. The lighting system according to claim 1, wherein the luminescent material has an excitation maximum $\lambda_{xm}$, wherein the light sources are configured to provide the source light with an intensity maximum $\lambda_{px}$, wherein $\lambda_{xm}-5$ nm$\leq\lambda_{px}\leq\lambda_{xm}+5$ nm.

9. A projection system or a luminaire comprising the system according to claim 1.

10. The lighting system according to claim 1, wherein the one or more heat transfer elements comprise one or more heat transfer element faces directed to one or more side faces, wherein at least part of the one or more heat transfer element faces of the respective one or more heat transfer elements is in physical contact with the elongated luminescent body, and wherein the shortest distance (d1) according to claim 6 is an average distance.

11. The lighting system according to claim 10, wherein 2 µm≤d1≤50 µm, and wherein the one or more heat transfer elements comprise or are functionally coupled to a heat sink.

12. The lighting system according to claim 1, wherein the side faces comprise a first side face, comprising the radiation input face, and a second side face configured parallel to the first side face, wherein the side faces define the height (H), wherein the elongated luminescent body further comprises the radiation exit window bridging at least part of the height (H) between the first side face and the second side face, wherein the reflector is configured at the second side face and is configured to reflect light source light escaping from the elongated luminescent body via second face back into the elongated luminescent body.

13. The lighting system according to claim 12, wherein the one or more heat transfer elements are at least in thermal contact with all side faces other than the first side face, and wherein the one or more heat transfer elements are configured as a monolithic heat transfer element, which is configured in thermal contact with a support for the light source, wherein a heat transfer element face of the one or more heat transfer element directed to the second face comprises the reflector.

14. The lighting system according to claim 1, comprises a plurality of light sources, wherein the light sources have optical axes (O) configured perpendicular to one or more of the one or more side faces.

15. The lighting system according to claim 14, wherein the plurality of light sources is configured to provide the light source light to only one of the one or more side faces.

* * * * *